United States Patent
Yamada

(10) Patent No.: US 8,417,059 B2
(45) Date of Patent: Apr. 9, 2013

(54) IMAGE PROCESSING DEVICE, IMAGE PROCESSING METHOD, AND PROGRAM

(75) Inventor: Hitoshi Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/375,726

(22) PCT Filed: Jun. 3, 2008

(86) PCT No.: PCT/JP2008/001397
§ 371 (c)(1),
(2), (4) Date: Mar. 5, 2009

(87) PCT Pub. No.: WO2009/001510
PCT Pub. Date: Dec. 31, 2008

(65) Prior Publication Data
US 2009/0290809 A1    Nov. 26, 2009

(30) Foreign Application Priority Data

Jun. 28, 2007   (JP) ................. 2007-170174

(51) Int. Cl.
*G06K 9/20*  (2006.01)
(52) U.S. Cl. ........ 382/283; 382/107; 382/236; 382/282; 382/190; 382/199; 382/242; 382/289; 382/294; 382/297; 348/154; 348/155; 348/699; 348/352; 348/208.4; 348/208.13; 348/402.1; 348/416.1; 348/413.1
(58) Field of Classification Search .................. 382/190, 382/199, 242, 236, 289, 294, 297, 107, 282–283; 348/154–155, 352, 699, 208.4, 208.13, 208.16, 348/402.1, 413.1, 416.1
See application file for complete search history.

(56) References Cited

U.S. PATENT DOCUMENTS

| 5,034,986 | A | * | 7/1991 | Karmann et al. | 382/103 |
| 5,717,441 | A | * | 2/1998 | Serizawa et al. | 345/573 |
| 5,828,423 | A | * | 10/1998 | Serizawa et al. | 348/699 |
| 5,886,742 | A | * | 3/1999 | Hibi et al. | 375/240.16 |
| 5,896,176 | A | * | 4/1999 | Das et al. | 375/240.15 |

(Continued)

FOREIGN PATENT DOCUMENTS

| EP | 1 117 251 | 7/2001 |
| EP | 1117251 A1 * | 7/2001 |

(Continued)

OTHER PUBLICATIONS

Background Mosaicking—coding, Frederic et al., IEEE, 1996, 0-7803-3256X, pp. 673-676.*

(Continued)

*Primary Examiner* — Jayesh A Patel
(74) *Attorney, Agent, or Firm* — Wenderoth, Lind & Ponack, L.L.P.

(57) ABSTRACT

A motion vector calculation unit calculates inter-frame movement amounts. A masked region specification unit separates the entire edge image of frame feature data into (i) an edge image showing relatively large movement amounts and (ii) an edge image showing relatively small movement amounts. The masked region specification unit then specifies the edge image showing relatively large movement amounts as a region to be masked. This way, a correction parameter is detected from a region other than the masked region. When the correction parameter is a slang angle, a slant correction unit performs slant correction on a frame picture obtained by an image sensor.

15 Claims, 29 Drawing Sheets

U.S. PATENT DOCUMENTS

| | | | | |
|---|---|---|---|---|
| 5,991,447 | A * | 11/1999 | Eifrig et al. | 382/236 |
| 6,809,758 | B1 | 10/2004 | Jones | |
| 7,415,127 | B2 * | 8/2008 | Bodo et al. | 382/100 |
| 8,068,682 | B2 * | 11/2011 | Living | 382/236 |
| 8,175,121 | B2 * | 5/2012 | Fukuda et al. | 370/503 |
| 2007/0076982 | A1 * | 4/2007 | Petrescu | 382/294 |
| 2008/0187179 | A1 * | 8/2008 | Living | 382/107 |

FOREIGN PATENT DOCUMENTS

| | | |
|---|---|---|
| JP | 10-21408 | 1/1998 |
| JP | 2005-184685 | 7/2005 |
| JP | 2006-301675 | 11/2006 |

OTHER PUBLICATIONS

Video stabilization—features., Hu et al., IEEE, XP-002560869, 2007, pp. 1-6.*

Supplementary European Search Report issued Jan. 11, 2010 in EP 08 76 3994.

Dufaux, F. et al., *Background Mosaicking for Low Bit Rate Video Coding, IEEE* (Sep. 16, 1996), pp. 673-676.

Hu, R. et al., *Video Stabilization Using Scale-Invariant Features, IEEE* (2007), XP-002560869.

International Search Report issued Sep. 16, 2008 in the International (PCT) Application of which the present application is the U.S. National Stage.

Trung Ngo Thanh et al., "Robust and Real-time Rotation Estimation of Compound Omnidirectional Sensor", 2007 IEEE International Conference on Robotics and Automation Roma, Italy, Apr. 10-14, 2007. III. Motion and Motion Computation of Distant Feature Points, pp. 4226-4231.

* cited by examiner

FRAME FEATURE DATA
OBTAINED FROM FRAME t

— APPROXIMATE FEATURES OF FRAME t
IN THE FORM OF LINES

FIG. 6A
MOTION VECTORS BETWEEN
FRAMES t-1 AND t
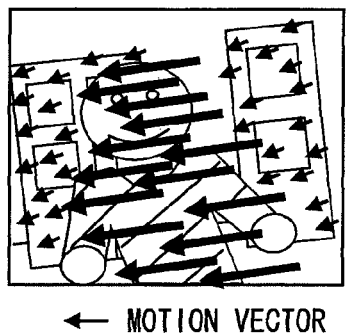
← MOTION VECTOR
FIG. 6B
| INFORMATION INDICTING FOREGROUND EDGE IMAGE |
|---|
| COORDINATES 1 OF BLOCK |
| COORDINATES 2 OF BLOCK |
| COORDINATES 3 OF BLOCK |
| COORDINATES 4 OF BLOCK |
| . . . |
| COORDINATES n OF BLOCK |
FIG. 6C
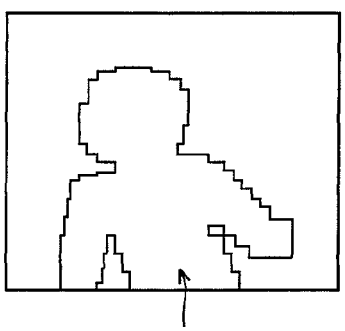
FOREGROUND EDGE IMAGE THAT HAS BEEN APPROXIMATED IN
THE FORM OF BLOCKS EACH COMPOSED OF 16 × 16 PIXELS

FIG. 7A

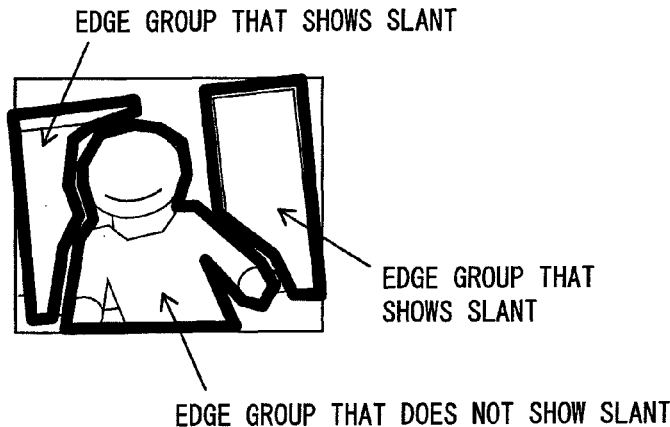

EDGE GROUP THAT SHOWS SLANT

EDGE GROUP THAT SHOWS SLANT

EDGE GROUP THAT DOES NOT SHOW SLANT

FIG. 7B

MASK PATTERN

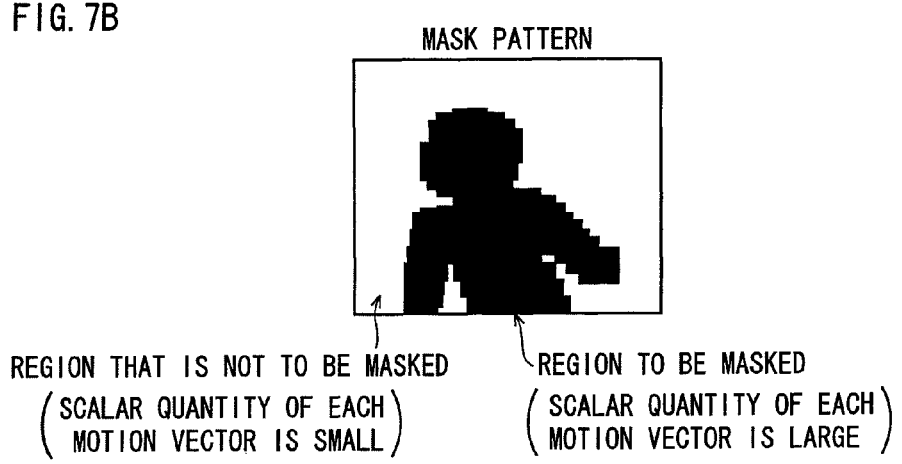

REGION THAT IS NOT TO BE MASKED
(SCALAR QUANTITY OF EACH MOTION VECTOR IS SMALL)

REGION TO BE MASKED
(SCALAR QUANTITY OF EACH MOTION VECTOR IS LARGE)

FIG. 7C

MASK PATTERN

| FFFF | FFFF | FFFF | FFFF | FFFF | FFFF | FFFF | FFFF |
|------|------|------|------|------|------|------|------|
| FFFF | FFFF | FFFF | FFFF | FFFF | FFFF | FFFF | FFFF |
| FFFF | FFFF | 0000 | 0000 | FFFF | FFFF | FFFF | FFFF |
| FFFF | FFFF | 0000 | 0000 | 0FFF | FFFF | FFFF | FFFF |
| FFFF | FFFF | 0000 | 0000 | 0FFF | FFFF | FFFF | FFFF |
| FFFF | FFFF | 0000 | 0000 | 0FFF | FFFF | FFFF | FFFF |
| FFFF | FFFF | 0000 | 0000 | 0000 | 0FFF | FFFF | FFFF |
| FFFF | F000 | 0000 | 0000 | 0000 | 000 | FFFF | FFFF |
| FFFF | F000 | 0000 | 0000 | 0000 | 0000 | 0FFF | FFFF |
| FFFF | 000 | 0000 | 0000 | 0000 | 0000 | 0000 | FFFF |
| FFFF | 000 | 000 | 0000 | 0000 | 000 | 0000 | FFFF |
| FFFF | 000 | 0 | 0000 | 0000 | 000 | FFFF | FFFF |

FFFF : YCbCr VALUE OF PIXEL BELONGING TO BACKGROUND EDGE IMAGE
0000 : YCbCr VALUE OF PIXEL BELONGING TO FOREGROUND EDGE IMAGE

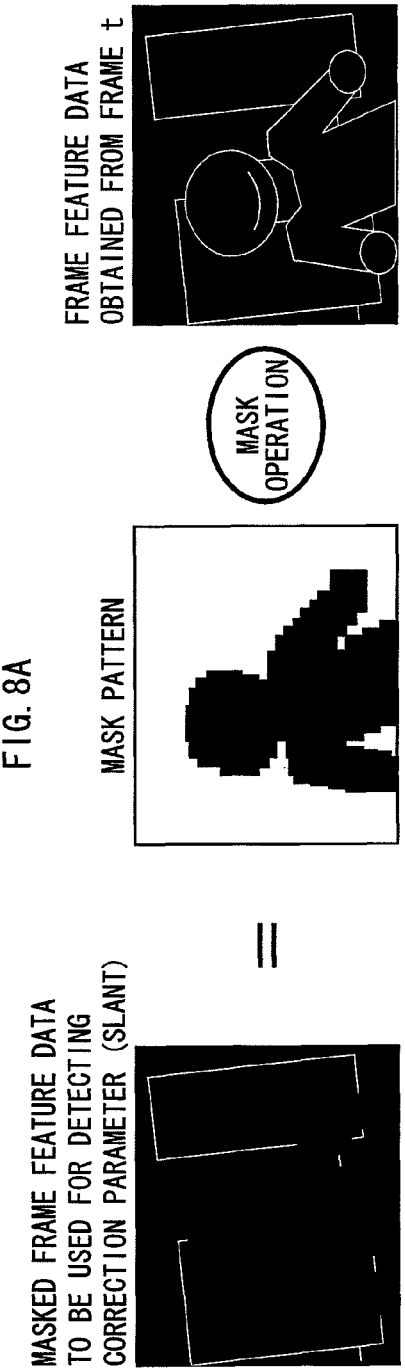
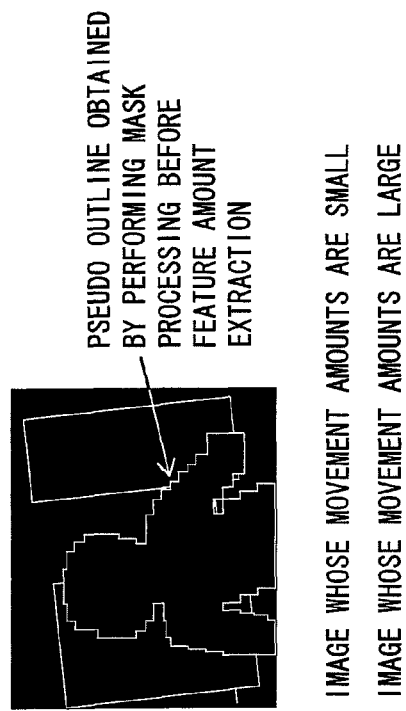
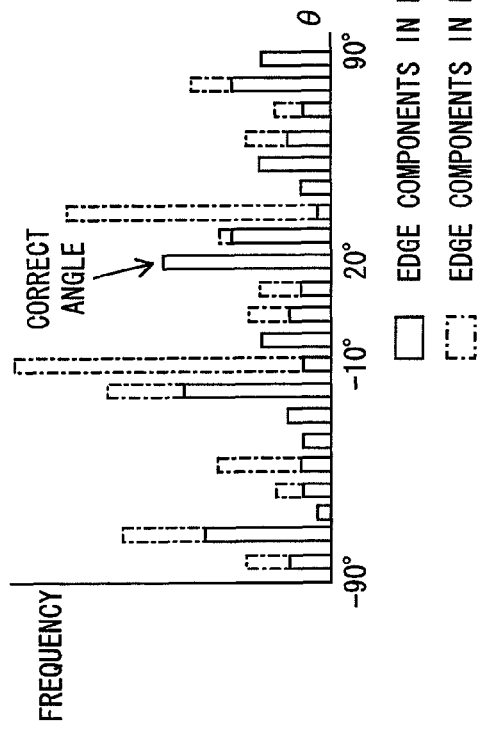
FIG. 8A
FIG. 8B
FIG. 8C

FRAME PICTURE OBTAINED BY PERFORMING 20° -SLANT CORRECTION

☐ EDGE COMPONENTS IN BACKGROUND EDGE IMAGE WHOSE MOVEMENT AMOUNTS ARE SMALL

⌐⌐ EDGE COMPONENTS IN FOREGROUND EDGE IMAGE
└─┘ WHOSE MOVEMENT AMOUNTS ARE LARGE

☐ EDGE COMPONENTS IN BACKGROUND EDGE IMAGE WHOSE MOVEMENT AMOUNTS ARE SMALL

IMAGE TO BE PROCESSED

FRAME FEATURE DATA

MASKED FRAME FEATURE DATA WITH
FOREGROUND EDGE IMAGE MASKED

MASKED FRAME FEATURE DATA WITH
BACKGROUND EDGE IMAGE MASKED

FIG. 15
MASKED FRAME FEATURE DATA WITH
FOREGROUND EDGE IMAGE MASKED
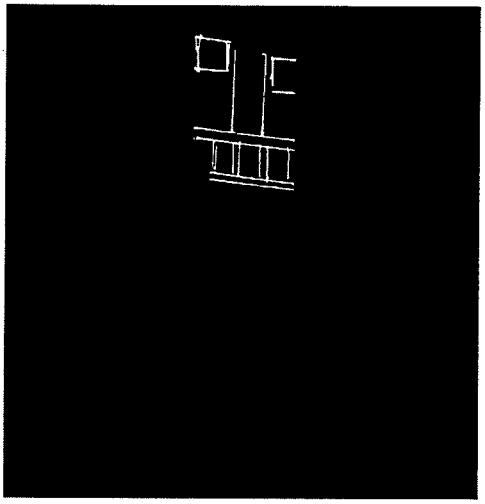
MASKED FRAME FEATURE DATA WITH
BACKGROUND EDGE IMAGE MASKED
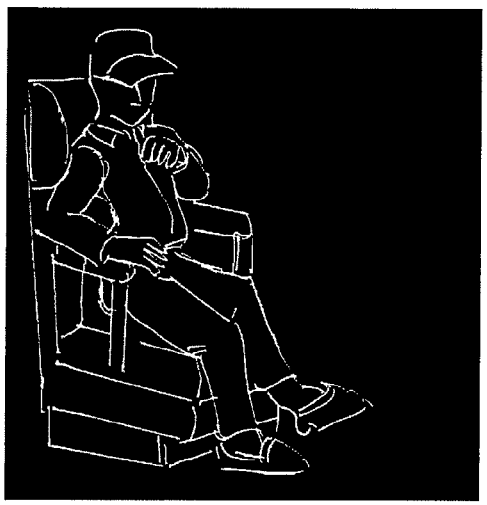
ANGLE RANGE $\alpha 1$
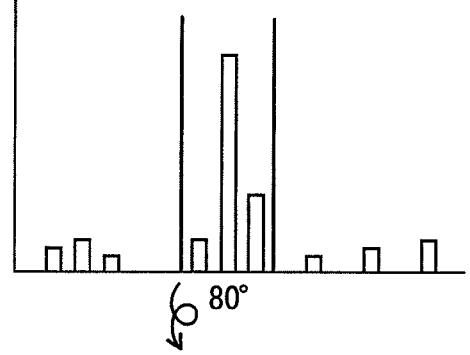
80°
RELIABILITY LEVEL R1
ANGLE RANGE $\alpha 2$
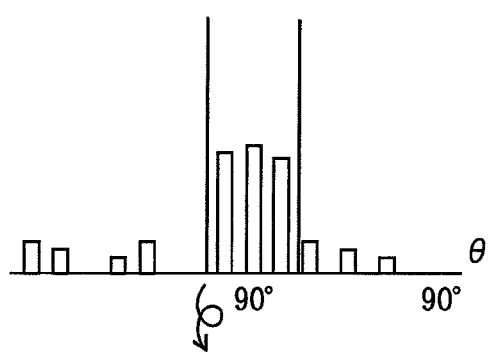
90°   90°
RELIABILITY LEVEL R2
WHEN R1>R2,
ANGLE RANGE $\alpha 1$ IS USED

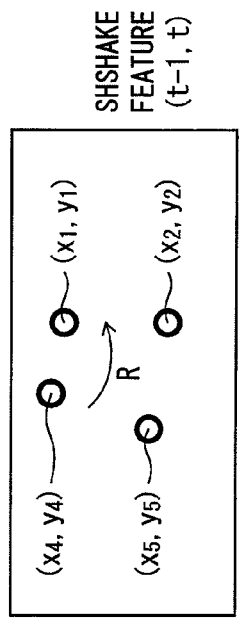
FIG. 18B
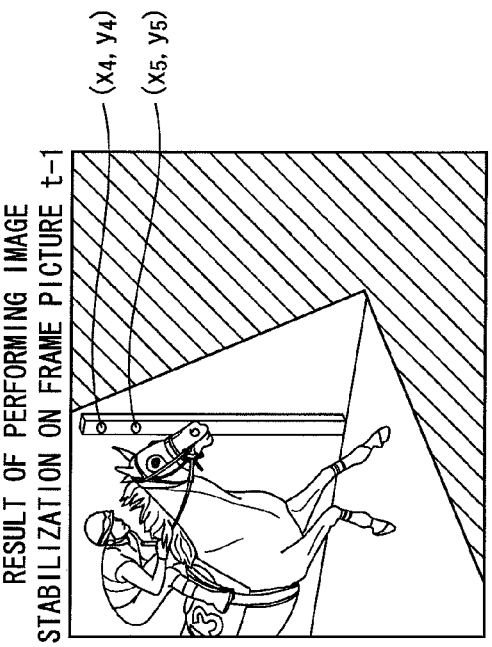
FIG. 18C
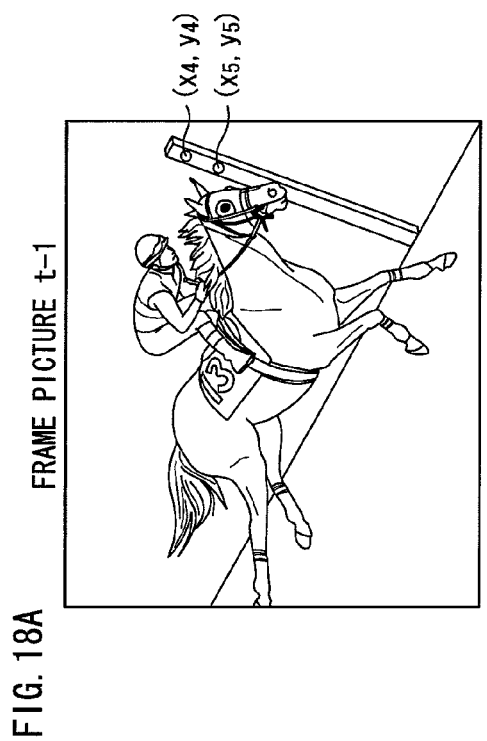
FIG. 18A
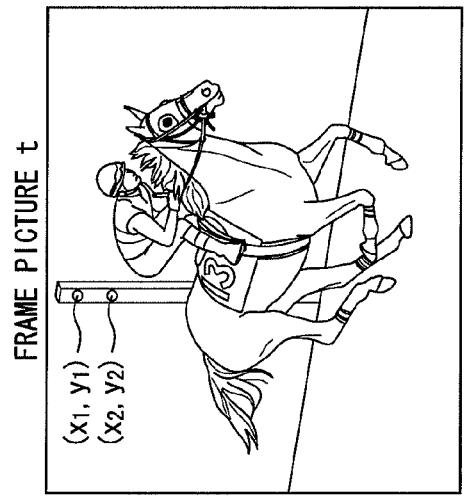

FIG. 19A

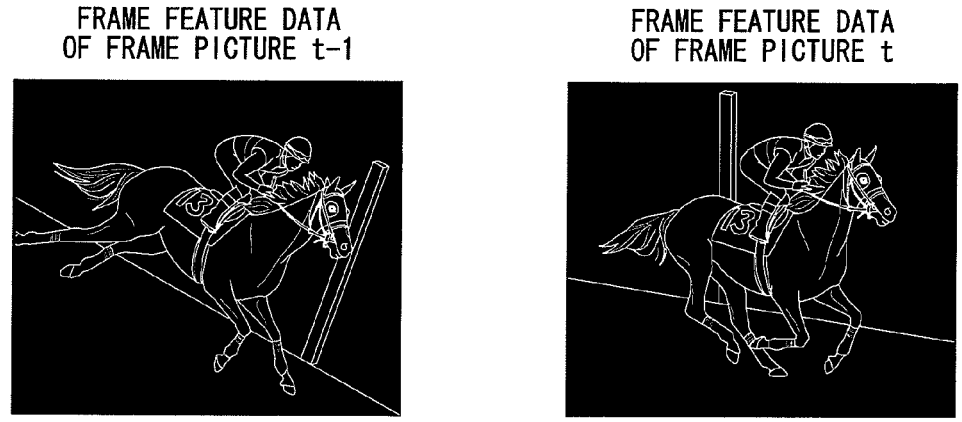

FRAME FEATURE DATA OF FRAME PICTURE t-1

FRAME FEATURE DATA OF FRAME PICTURE t

FIG. 19B

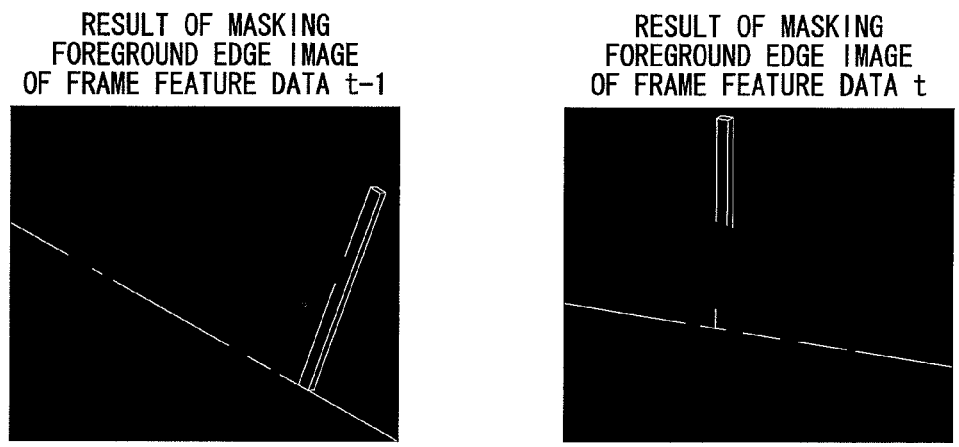

RESULT OF MASKING FOREGROUND EDGE IMAGE OF FRAME FEATURE DATA t-1

RESULT OF MASKING FOREGROUND EDGE IMAGE OF FRAME FEATURE DATA t

FIG. 19C

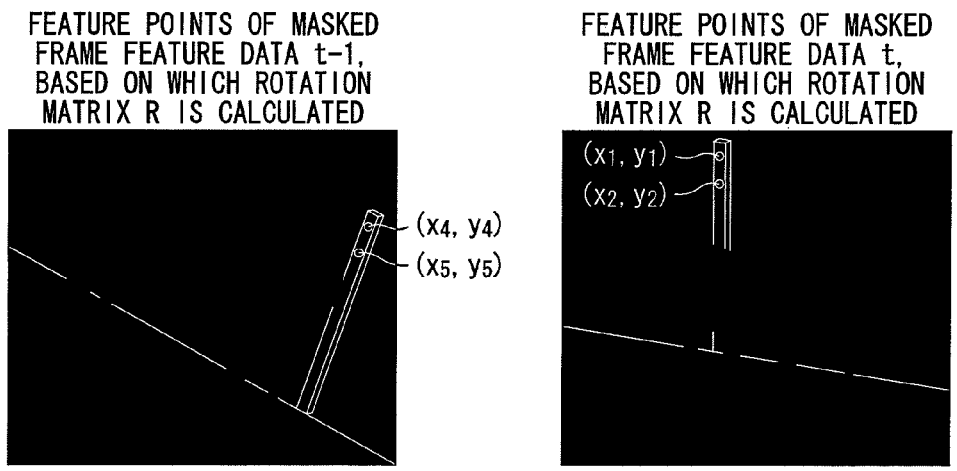

FEATURE POINTS OF MASKED FRAME FEATURE DATA t-1, BASED ON WHICH ROTATION MATRIX R IS CALCULATED

FEATURE POINTS OF MASKED FRAME FEATURE DATA t, BASED ON WHICH ROTATION MATRIX R IS CALCULATED $(x_4, y_4)$
$(x_5, y_5)$ $(x_1, y_1)$
$(x_2, y_2)$

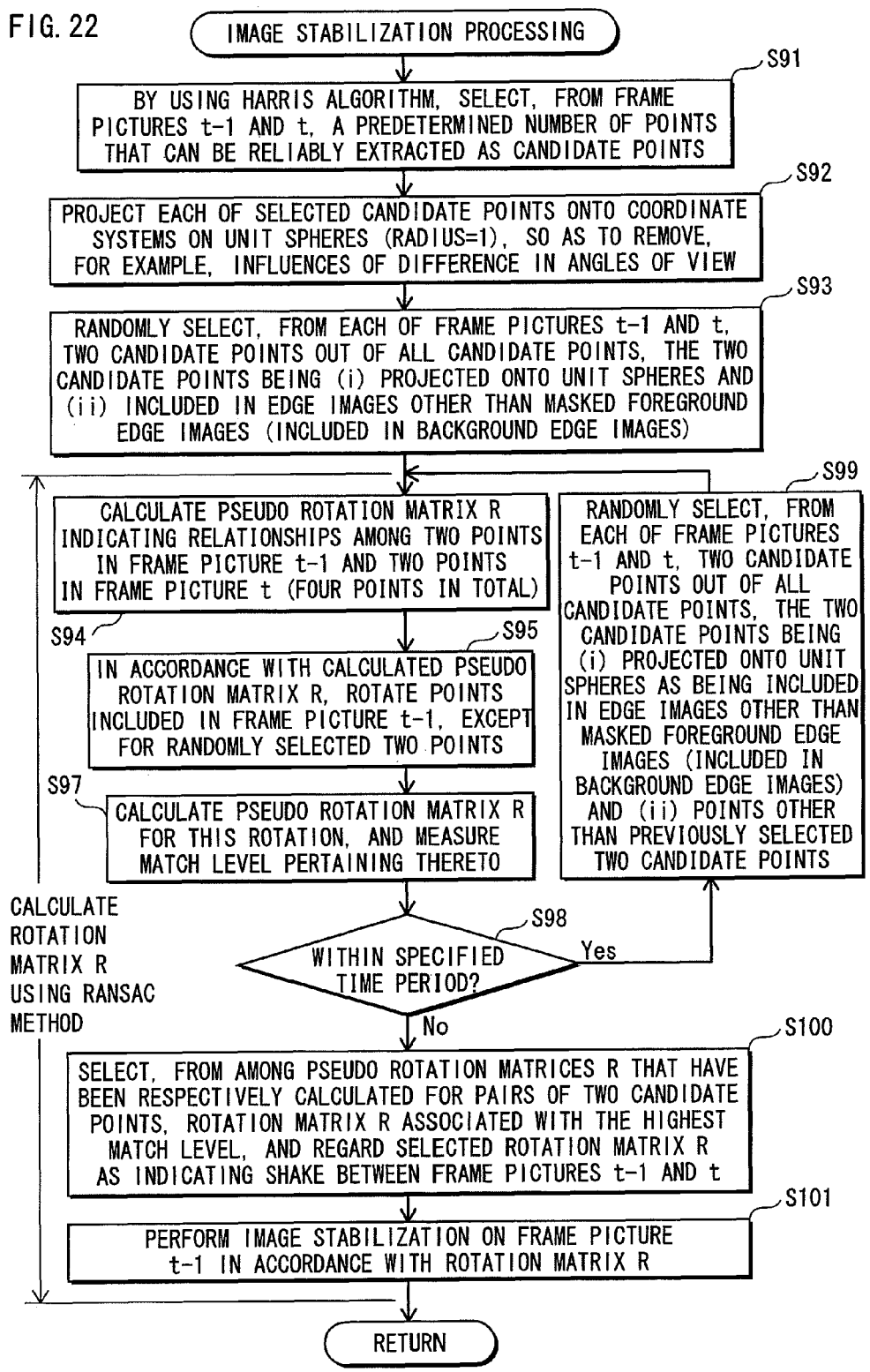

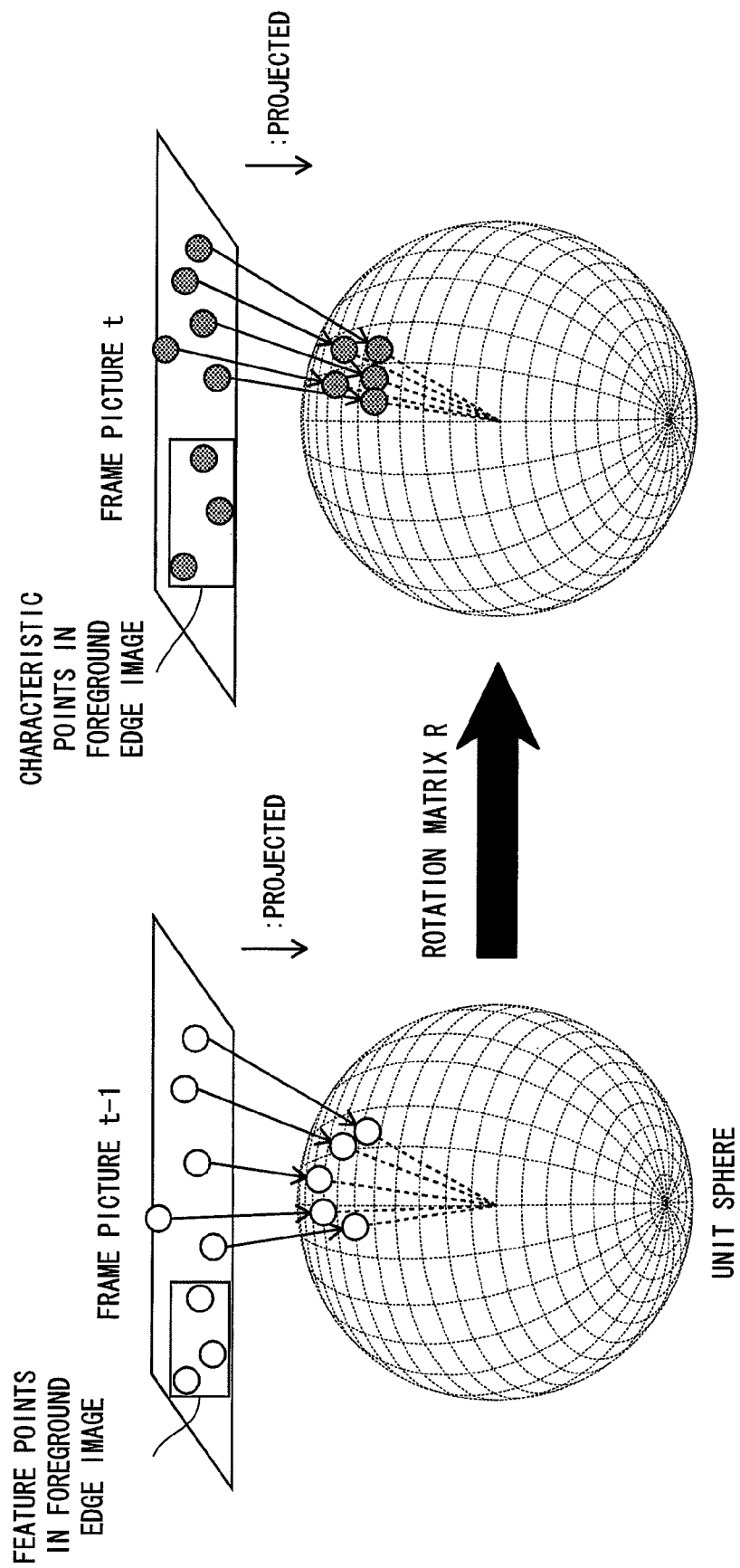

FIG. 25A   MOTION VECTORS BETWEEN
FRAMES t-1 AND t

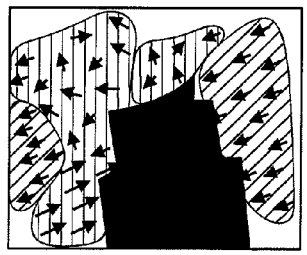

→ MOTION VECTOR

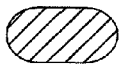 EDGE IMAGE SHOWING MOTION VECTORS WHOSE DIRECTIONS ARE THE SAME AS DIRECTION SHOWN BY RESULT OF SHAKE ESTIMATION

 EDGE IMAGE SHOWING MOTION VECTORS WHOSE DIRECTIONS ARE DIFFERENT FROM DIRECTION SHOWN BY RESULT OF SHAKE ESTIMATION FIG. 25B   MOTION VECTORS BETWEEN
FRAMES t-1 AND t

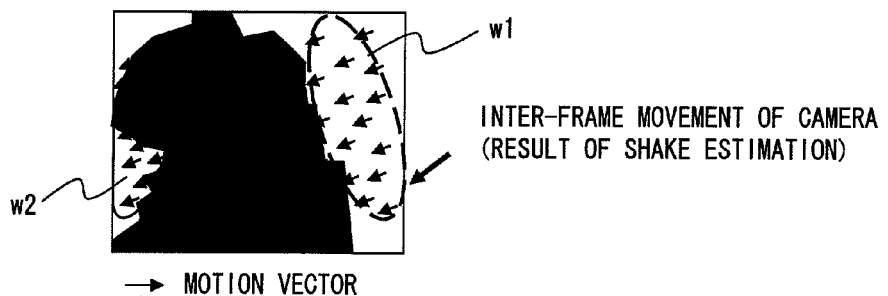

INTER-FRAME MOVEMENT OF CAMERA (RESULT OF SHAKE ESTIMATION)

→ MOTION VECTOR

FIG. 25C   MASKED FRAME FEATURE DATA IN WHICH BLOCKS THAT SHOW MOTION VECTORS WHOSE DIRECTIONS ARE DIFFERENT FROM DIRECTION SHOWN BY RESULT OF SHAKE ESTIMATION HAVE BEEN MASKED

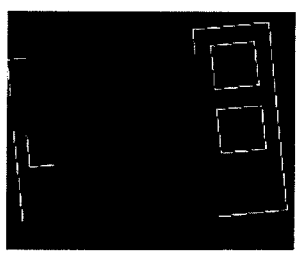

IMAGE PROCESSING DEVICE, IMAGE PROCESSING METHOD, AND PROGRAM

TECHNICAL FIELD

The present invention belongs to a technical field of image correction processing.

BACKGROUND ART

Image correction processing is technology to detect a correction parameter from frame picture data to be processed and to make corrections to the frame picture data in accordance with the correction parameter. Conventional image correction processing includes an image slant correction technique and an image stabilization technique.

An image slant correction technique is a technique to estimate an angle of slant (hereafter, "slant angle"), by which the image is slanted with respect to a reference angle, and to correct the image in accordance with the slant angle. An image stabilization technique is a technique to correct shakes shown by frame picture data pieces of frame pictures by stabilizing backgrounds of the frame picture data pieces in the same position, the frame pictures being taken in succession, and the shakes being triggered when taking the frame pictures.

The conventional slant correction technique has been in wide use in the industrial field of optical scanning devices, such as a scanner and a copier. In recent years, an application of such a slant correction technique to the industrial field of imaging apparatuses has also been considered. The slant correction technique has been materialized as products such as an image processing device, a video camera incorporating the stated image processing device, and a program for performing imaging processing.

The following describes the technological significance of an application of a slant correction technique to video cameras. If a video camera operator takes a video with a video camera while walking, then the video camera shakes and moves in accordance with the movement of the operator. Therefore, it is not always the case that the operator can hold the video camera steady in a horizontal orientation while taking a video and walking at the same time. Furthermore, if the operator takes a video without looking into the viewfinder of the video camera, i.e., without watching the video that is actually being taken, then the operator cannot always hold the video camera steady in a horizontal orientation, even thought he/she desires so.

It is a pain to watch a video that was taken with a video camera held in a non-horizontal orientation. In order to make such a slanted video horizontal, the above-described slant correction technique must be used. In the above-described slant correction technique, how to determine the reference angle is a very important issue. Patent Document 1 cited blow discloses technology for performing slant correction by using the slant of an image of the text, which has been read by a scanner, as a reference angle.

Patent Document 1:
Japanese Laid-Open Patent Application No. 2005-184685

SUMMARY OF THE INVENTION

The Problem the Invention is Going to Solve

Making a correction with high accuracy by using the above-described image processing depends on whether or not a correction parameter, in accordance with which the correction is made, can be detected with high accuracy. It can be said that if the correction parameter is detected with high accuracy, then the quality of a corrected image will be improved. For example, in performing slant correction, a detection algorithm called the Hough transform needs to be carried out because the angle of rotation is detected from frame picture data. However, since the Hough transform necessitates an operation for every pixel, a large operation load is imposed when using the Hough transform. If a picture to be processed has an image resolution of 1920×1080, then use of the Hough transform will require a large operation amount. The Hough transform is thus unsuited for use in mobile phones.

One possible way to increase the accuracy of correction is to obtain, in advance, information indicating an object shown in a frame picture and where the object is located in the frame picture. This is because an image of the text that has been read by a scanner or the like has a predetermined layout in general, and in the field where optical scanning devices are applied, angle estimation is conducted with the help of such layout information.

However, when it comes to taking a video with a video camera or the like, the condition/environment in which the video is taken varies depending on the operator of the video camera and timing of taking the video. Therefore, it seems unlikely that effective information such as the above-described layout information can be obtained in advance.

The present invention aims to provide an image processing device that can detect a correction parameter with high accuracy, without using pre-obtained information regarding an object to be imaged.

Means to Solve the Problem

The above problem can be solved by an image processing device for correcting frame picture data in accordance with a correction parameter, comprising: a generation unit operable to generate frame feature data indicating features of an edge image shown in the frame picture data; a calculation unit operable to calculate, from each of pixel blocks constituting the frame picture data, a motion vector indicating a movement between the frame picture data and previous frame picture data; a region specification unit operable to, in accordance with motion vectors calculated from the pixel blocks, specify a region to be masked in the frame feature data; and a detection unit operable to detect the correction parameter from an unmasked region of the frame feature data.

EFFECTS OF THE INVENTION

According to such an image processing device comprising the stated constituent elements for solving the aforementioned problem, the region to be masked is specified in accordance with the motion vectors that have been respectively calculated from the pixel blocks. In picture data, pixel blocks of an object (e.g., a person) in a foreground of ten show motion vectors having different magnitudes and directions from their counterpart pixel blocks included in the previous frame. An edge image corresponding to these pixel blocks is specified as the region to be masked.

This way, masking is performed on a foreground that shows an object (e.g., a person) located at a near distance from an imaging apparatus. Consequently, operation processing of detecting a correction parameter is performed on, out of the whole picture data obtained by taking a picture frame, an area other than the foreground, i.e., a background showing the real-world background.

In many cases, a background intrinsically includes structures (e.g., tall buildings) that have edge component values indicating horizontality and perpendicularity. More specifically, architectural structures, such as tall buildings, are thought to be included in the background.

In the above manner, the operation processing of detecting the correction parameter is performed only on feature amounts obtained from the unmasked region, i.e., feature amounts obtained from a background that has a high possibility of including still objects, such as architectural structures. This makes it possible to detect, with high accuracy, edges or the like of the structures (e.g., architectural structures) that have the real-world horizontal/perpendicular components as a correction parameter. By performing imaging processing (e.g., correction processing such as slant correction and image stabilization) in accordance with such a correction parameter, a high-quality picture can be obtained.

As set forth, the correction parameter is detected from the unmasked region of the frame feature data. This narrows down an edge image on which a detection algorithm for detecting a correction parameter (e.g., the Hough transform) should be performed; accordingly, the processing load required to perform the detection algorithm is reduced, and the power consumption can be lowered drastically as well. The above image processing device is therefore suitable for practical use in a mobile device. As the region to be masked generally includes a foreground, such a region can be specified by calculating motion vectors from consecutive frames. As calculation of such motion vectors allows determining the region to be masked, a correction parameter can be detected with high accuracy without necessitating the stated pre-obtained information.

BRIEF DESCRIPTION OF THE DRAWING

FIG. 6A shows a result of detecting motion vectors in association with consecutive frame pictures.

FIG. 6B shows an example of information indicating a foreground edge image.

FIG. 6C shows a shape of the foreground edge image that has been approximated in the form of blocks each of which is composed of 16×16 pixels.

FIG. 7A shows positions of effective edge information pieces each indicating a slant.

FIGS. 7B and 7C show examples of a mask pattern.

FIG. 8A schematically shows a logical operation for mask processing.

FIG. 8B shows a histogram in which (i) frequencies of angles obtained after performing mask processing are presented with solid lines, and (ii) frequencies of angles obtained without performing mask processing are presented with chain lines.

FIG. 8C shows edge information pieces generated for a pseudo outline that is the border separating the foreground edge image from the background edge image.

FIG. 15 shows masked picture data pieces and histograms generated in association therewith.

FIG. 18A shows examples of consecutive frames on which image stabilization is to be performed.

FIG. 18B shows an example of a rotation matrix R for transforming (X4,Y4) and (X5,Y5) in picture data of a frame picture t-1, such that they are placed in the same positions as (X1,Y1) and (X2,Y2) in picture data of a frame picture t, respectively.

FIG. 18C shows an example of the frame picture t-1 on which image stabilization has been performed.

FIG. 19A shows frame feature data pieces that have been respectively obtained from frame pictures t-1 and t.

FIG. 19B shows masked frame feature data pieces obtained by masking the foreground edge images of the frame feature data pieces t-1 and t shown in FIG. 19A.

FIG. 19C shows feature points that have been respectively detected from the masked frame feature data pieces of the frame pictures t-1 and t.

FIG. 22 is a flowchart of image stabilization processing.

FIG. 23 shows feature amounts obtained from the frame pictures t-1 and t, and the projection of the feature amounts onto a coordinate system of a unit sphere (radius=1).

FIG. 25A shows the frame feature data shown in FIG. 24 that has been separated into (i) edge images showing the same motion vectors as the result of shake feature (t-1,t) and (ii) edge images showing different motion vectors from the result of the shake feature (t-1,t).

FIG. 25B shows, out of motion vectors that have been respectively calculated from macro blocks, some motion vectors that are the same as the result of estimating a shake amount.

FIG. 25C shows masked frame feature data that is used for detecting a slant angle, which is a correction parameter.

Figure 1:
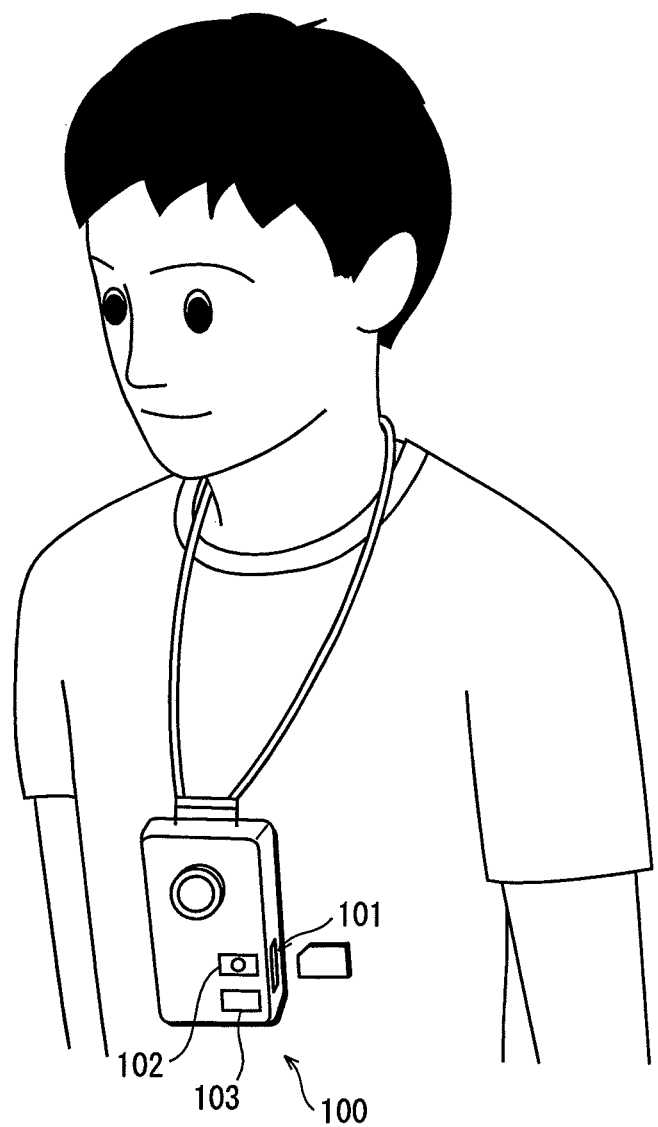
FIG. 1 shows a usage example of a video camera 100 in which an image processing device of the present invention is provided.

DESCRIPTION OF CHARACTERS 10 imaging device
20 DMA controller
30 frame memory
40 frame memory
50 image processing engine
60 card drive
70 inertial sensor
100 video camera
1 feature amount extraction unit
2 line detection unit
3 angle estimation unit
4 motion vector calculation unit
5 masked region specification unit
6 mask unit
7 slant estimation unit
8 encode unit
51 varifocal mask unit
52 reliability-based angle estimation unit
53 slant angle selection unit
54 shake feature extraction unit
55 shake amount estimation unit
56 image stabilization unit
57 mask pattern enlargement unit
58 image stabilization and slant correction unit
59 range-finding sensor

DETAILED DESCRIPTION OF THE INVENTION

The following describes an image processing device of the present invention, with reference to the accompanying drawings.

(Embodiment 1)

As one of many possible embodiments of the present invention, the present embodiment allows detecting, from current frame picture data, a slant as a correction parameter, and performing image processing on the current frame picture in accordance with the correction parameter. One example of such image processing is a rotation transformation.

FIG. 1 shows a usage example of an imaging apparatus to which the image processing device of the present invention is applied. As shown in FIG. 1, a user uses a neck strap to wear a video camera 100 in which the image processing device of the present invention is provided, so that he can take a video by handling the video camera 100 in a hands-free manner. The casing of the video camera 100 has (i) a card slot through which a semiconductor memory card that would serve as a recording medium can be inserted/ejected, (ii) a record button 102 to receive an operation to start imaging processing, and (iii) a stop button 103 to receive an operation to stop the imaging processing. By pressing the record button 102, the user can start the imaging processing with the video camera 100 in a hands-free manner. Slant correction is performed on the frame pictures obtained by performing the imaging processing. Once the slant correction is performed on picture data pieces of the frame pictures, the picture data pieces are encoded in the form of (i) still images or (ii) a video composed of said picture data pieces that are output in succession. Thereafter, the picture data pieces are written into a recording medium such as a semiconductor memory card.

Figure 2:
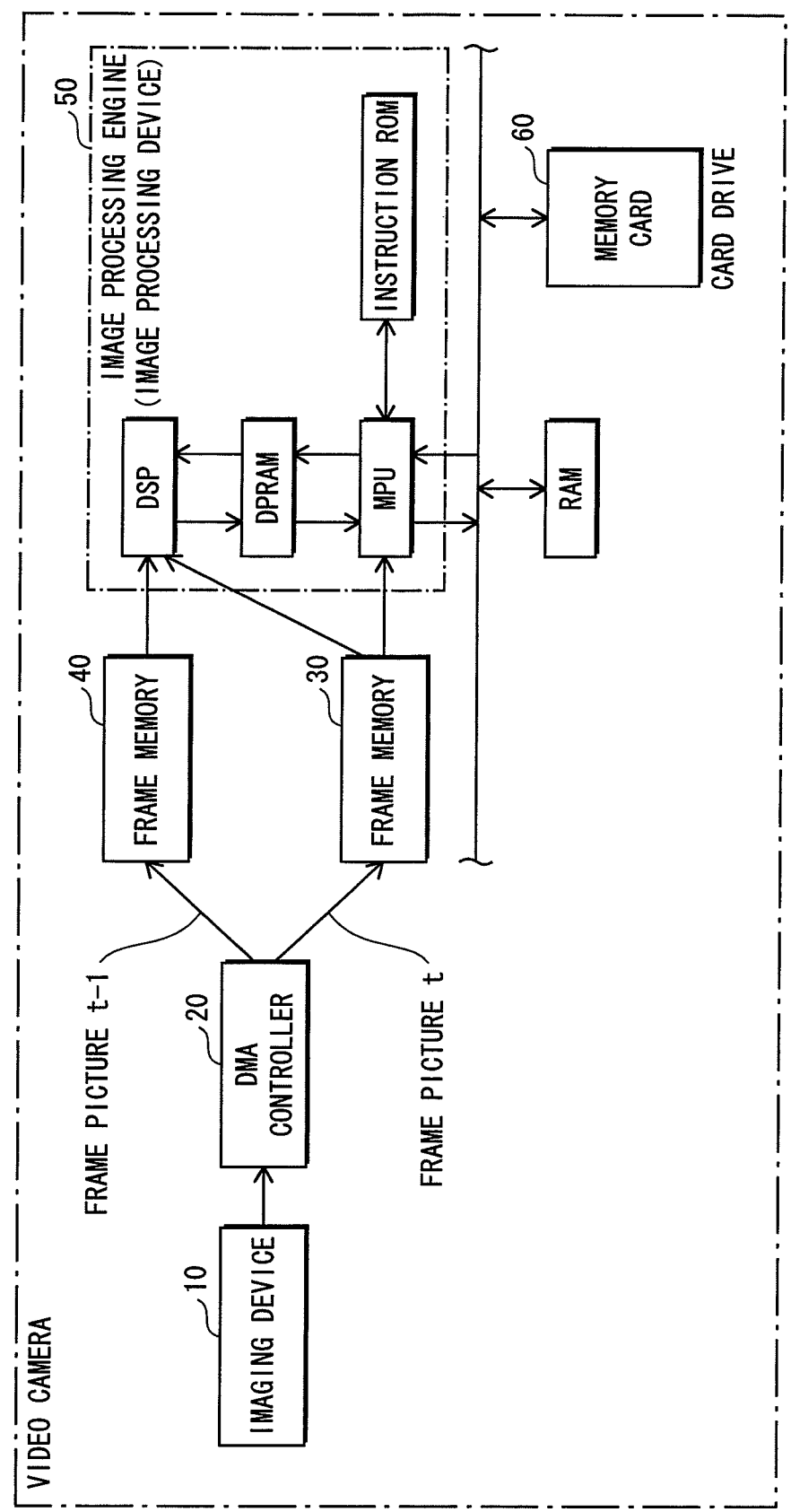
FIG. 2 shows a hardware structure of the video camera 100 in which the image processing device of the present invention is provided.

FIG. 2 shows a hardware structure of the video camera 100 in which the image processing device of the present invention is provided.

The video camera 100 is composed of an imaging device 10, a DMA controller 20, frame memories 30 and 40, an image processing engine 50, and a card drive 60.

(Imaging Device 10)

The imaging device 10 includes, for example, an image sensor such as a Charge Coupled Device (CCD) image sensor or a Complementary Metal Oxide Semiconductor (CMOS) image sensor. A quantity of light (analog value) received by the image sensor is converted from analog to digital then written into the frame memories 30 and 40 (described later) as data for one screen every predetermined unit of time.

(DMA Controller 20)

The DMA controller 20 writes picture data pieces obtained by the imaging device 10 into the frame memories 30 and 40 without using MPU.

For example, the DMA controller 20 writes two consecutive frame pictures t-1 and t into the frame memories 30 and 40, respectively, the frame memories 30 and 40 being memory areas that have been provided in advance.

(Frame Memories 30 and 40)

Frame memories 30 and 40 are storage areas that are provided every predetermined unit of time, so that each of them can store therein a different one of the consecutive frame pictures. These frame memories do not need to be physically separated from each other. Provided one memory (SD-RAM) is divided into a plurality of storage areas, the frame memories 30 and 40 may be two of the storage areas that are close to each other. Address areas of the frame memories 30 and 40 are mapped in a predetermined manner, so that MPU (described later) can access the frame memories 30 and 40.

(Image Processing Engine 50)

The image processing engine 50 performs image processing of correcting a slant shown in the frame picture stored in the frame memory 30. Here, the image processing engine 50 (image processing device) complies with, for example, a general von Neumann computer architecture. MPU, RAM, and an external slot access unit (e.g., a memory card 60) are connected to the bus of the image processing engine 50. DSP shown in FIG. 2 is provided as a processor that processes picture data pieces stored in the frame memories.

(Card Drive 60)

The card drive 60 is a slot provided for writing/storing the frame picture pieces that have been encoded by the image processing engine 50 into an external recording medium such as a semiconductor memory card.

This completes the description of the hardware structure of the video camera 100.

Figure 3:
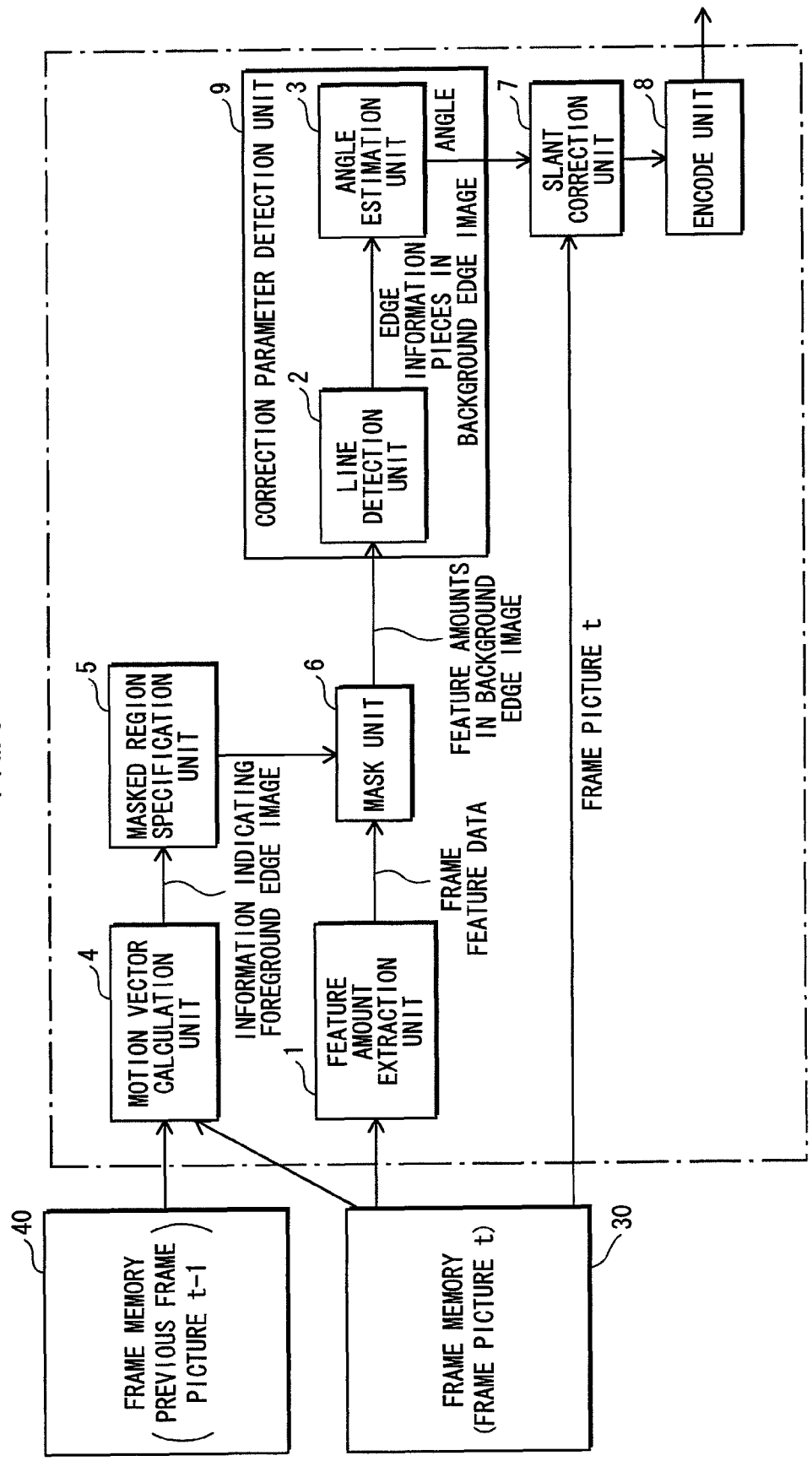
FIG. 3 shows a functional structure of software of an image processing engine 50 pertaining to the present invention.

Described below, with reference to FIG. 3, are functional blocks of the image processing engine 50.

The image processing engine 50 is composed of a feature amount extraction unit 1, a line detection unit 2, an angle estimation unit 3, a motion vector calculation unit 4, a masked region specification unit 5, a mask unit 6, a slant correction unit 7, and an encode unit 8.

(Feature Amount Extraction Unit 1)

The feature amount extraction unit 1 extracts edge components from picture data of a frame picture taken at time t, the edge components being the opposite of luminance components, and the picture data being stored in the frame memory 30. One method to detect edges is to first detect a value indicating an edge or luminance from each pixel by using the Sobel filter or the Canny filter, and then to compare each obtained value with a predetermined threshold. Once the feature extraction is performed on the picture data, the picture data is stored in DPRAM as frame feature data.

The frame feature data stored in DPRAM shows feature outlines of objects shown in the frame picture.

Figure 4A:
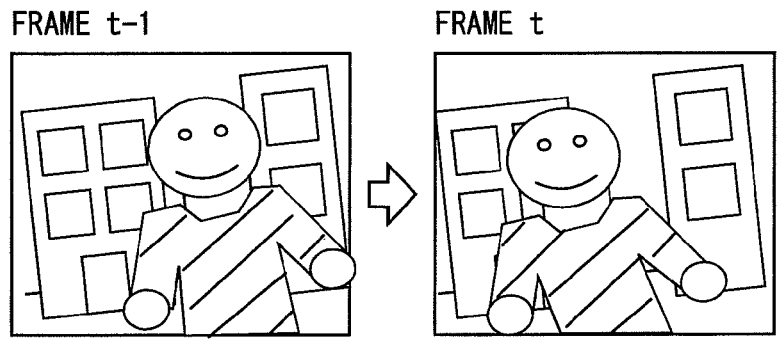
FIG. 4A shows a frame picture t-1 and a frame picture t that are written, by a DMA controller 20, into a frame memory 30 and a frame memory 40, respectively.
Figure 5A:
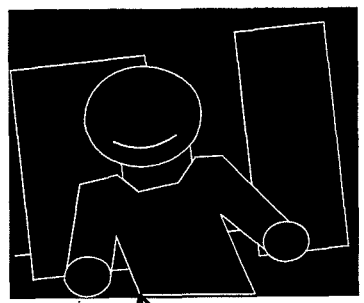
FIG. 5A shows frame feature data obtained from the frame picture t of FIG. 4A.
Figure 5B:
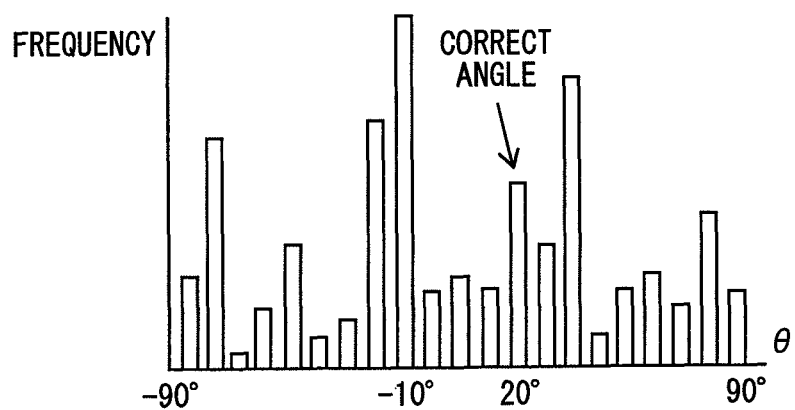
FIG. 5B shows an example of a histogram that is generated in order to perform angle estimation.

FIG. 5A shows frame feature data obtained from the frame picture t of FIG. 4A. The frame feature data is composed of data pieces each showing an edge component of luminance information. Each data piece showing the edge component of luminance information is obtained after irrelevant edge components are removed by noise removal or the like. Referring to the frame feature data of FIG. 5A, pixels that do not show edges are shown in black, while pixels that show edges are shown in white. Referring to FIG. 5A, white lines represent an assemblage of pixels that have been judged to show the edge components. The white lines include outlines of objects (e.g., a person and architectural structures) shown in the frame picture t.

(Motion Vector Calculation Unit 4)

By comparing the picture data of time t stored in the frame memory 30 with the picture data of time t-1 stored in the frame memory 40, the motion vector calculation unit 4 calculates a motion vector from each block included in the picture data of time t and obtains a scalar quantity thereof, i.e., a movement amount.

The calculation of each motion vector and the obtainment of each scalar quantity can be achieved by detecting, from pixels included in the picture data of the frame picture t-1, a block of pixels that has the highest correlation value with respect to a predetermined block (e.g., pixel values of a block comprising 16 pixels (width)×16 pixels (height)) included in the picture data of time t, the block of pixels being of the same size as the predetermined block. This is for detecting, from the frame picture t-1, a position to which the predetermined block in the picture data of time t would correspond.

As one example of the above, a block matching method will be described in detail below, under the assumption that each frame is divided into a plurality of blocks each of which has the same predetermined size, e.g., 16 pixels (width)×16 pixels (height). First, the block matching method is performed under the assumption that within each block, movements show by pixels (e.g., 16×16 pixels) are similar to one another. Accordingly, after dividing a current image into a plurality of blocks, the block matching method detects, from the current image or another image, pixel values (16×16) that have the highest correlation with a predetermined block included in the current image. This way the block matching method detects an inter-frame movement shown in the predetermined block. The motion vector detection unit 4 performs matching processing between the frame pictures t-1 and t on a block-by-block basis. By using a method of measuring a similarity level, such as Sum of Absolute Difference (SAD), the motion vector detection unit 4 searches one frame for a block that has the highest similarity to another block in another frame. This search is performed on a block-by-block basis. Specifically, the motion vector detection unit 4 searches a certain range of said one frame for the block that has the highest similarity to the other block in the other frame.

Note, when DSP is a special purpose DSP dedicated for video encoding, such as MPEG, motion vectors that are obtained by DSP in the course of encoding consecutive picture data pieces that are respectively stored in the frame memories 30 and 40 in a movie format may be used as movement amounts.

The following is a detailed description how movement amounts are detected, with reference to picture data pieces of pictures taken.

FIG. 4A shows picture data that was written into the frame memory 30 in association with time t-1, and picture data that was written into the frame memory 40 in association with time t. As shown in FIG. 4A, a person shown in the frame picture t-1 significantly moved to the left between time t-1 and time t. In accordance with his/her move, the operator of the video camera 100 has also moved the video camera 100 to the left, although to a small extent compared to the amount of the movement made by the person in the frame picture t-1. It should be noted that the frame pictures t-1 and t were both taken with the video camera 100 slanted by 20° with respect to the real-world horizon. To assist comprehension, the frame picture t-1 is described herein as a frame that was taken immediately before (i.e., one frame ahead of) the frame picture t.

Figure 4B:
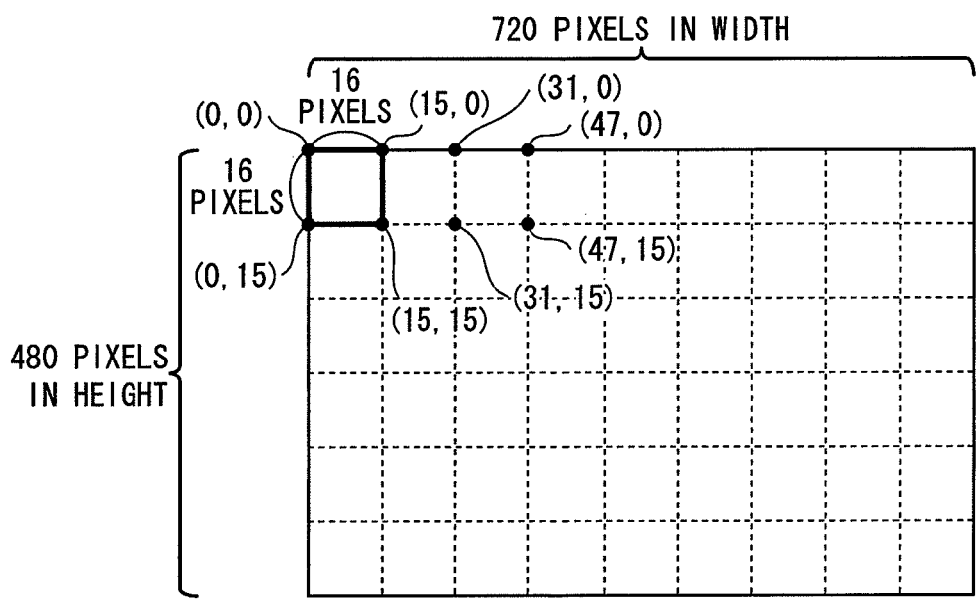
FIG. 4B shows a plurality of blocks constituting a frame picture.
Figure 4C:
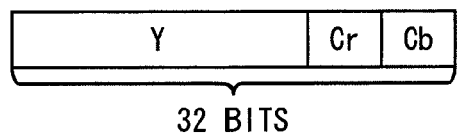
FIG. 4C shows 32-bit data indicating YCbCr representing a pixel value of each pixel included in the frame picture.

FIG. 4B shows how a frame is divided into a plurality of blocks, the division being performed in the course of detecting movement amounts. It is assumed here that every frame has an image resolution of 720 pixels (width)×480 pixels (height). For example, every frame is divided into a plurality of blocks each of which has a size of 16 pixels (width)×16 pixels (height). Positions of the blocks can be expressed by a coordinate system whose origin is the coordinates assigned to the upper left corner of the corresponding frame picture. For example, the following four coordinates are assigned to vertices of the upper left block: (0,0), (15,0), (0,15) and (15,15). Each block can be uniquely identified by pairs coordinates assigned to its vertices (for example, (0,0), (15,0), (31,0), (0,15), (15,15), (31,15)).

FIG. 6A schematically illustrates a result of calculating motion vectors after the consecutive frame pictures shown in FIG. 4A were taken. Arrows shown in FIG. 6A schematically indicate directions and magnitudes of the calculated motion vectors. In the frame picture, motion vectors having large magnitudes are calculated from an edge image showing the person (i.e., blocks corresponding to this edge image). Here, the average of the movement amounts of the blocks corresponding to such an edge image is regarded as "1".

In order for the mask unit 6 to perform masking, the masked region specification unit 5 performs region specification, i.e., specifies which region in the frame feature data should be masked. In performing the region specification on a block-by-block basis, the masked region specification unit 5

(i) separates a foreground edge image from the frame feature data by comparing a movement amount of each block with the average value of magnitudes of motion vectors calculated from all of the blocks (or, a value obtained by changing the magnitudes of the motion vectors), and (ii) extracts information pieces each indicating whether each block corresponds to a background edge image. Then, out of the frame feature data, the masked region specification unit 5 specifies the separated foreground edge image to be a region to be masked.

The masked region specification unit 5 judges whether or not each block corresponds to the background edge image only when the image of the frame picture data as a whole does not show a significant movement from the image of another frame picture data. Accordingly, before making such a judgment, the masked region specification unit 5 performs preprocessing.

In performing the preprocessing, the masked region specification unit 5 judges whether or not a movement amount of the entire frame picture (e.g., the average value of the movement amounts of all the pixel blocks) is greater than a predetermined upper limit. When the masked region specification unit 5 judges that the average value of the movement amounts is greater than the upper limit, it means that the video camera 100 might have been shaken violently and therefore the frame picture looks excessively slanted. In this case, the masked region specification unit 5 causes the frame memory 30 to discard the frame picture t stored therein, and causes the feature amount extraction unit 1 to abort the feature amount extraction. This makes the next frame picture a processing target on which the feature amount extraction unit 1 performs the feature amount extraction. With the presence of this preprocessing, the processing of separating a foreground edge image is not performed for a frame picture that as a whole shows a large movement from another frame picture and thus looks excessively slanted. This completes the description of the preprocessing performed by the masked region specification unit 5.

The processing of separating a foreground edge image is performed in the following procedure.

First, each of the movement amounts of the blocks constituting the frame picture of time t is compared with a predetermined separation indicator. Each block is judged to be corresponding to the foreground edge image when its movement amount is greater than the predetermined separation indicator. On the other hand, each block is judged to be corresponding to the background edge image (in other words, each block is not judged to be corresponding to the foreground edge image) when its movement amount is smaller than the predetermined separation indicator.

Here, the value of the separation indicator may be expressed as an absolute amount (a value specified in advance) or a relative amount (a value that is relatively obtained from the picture data, e.g., the average value of the movement amounts of all the blocks).

In a case where the value of the separation indicator is expressed as a relative amount, the masked region specification unit 5 obtains the separation indicator by calculating the average value, the median value, or the like of movement amounts calculated from the blocks constituting picture data of certain time. The masked region specification unit 5 then judges whether each block corresponds to the foreground edge image by comparing each of the movement amounts of the blocks with the obtained indicator.

A result of the aforementioned judgment about whether each block is included in the background view (two-valued data) is stored in correspondence with positional coordinates of the block.

FIG. 6B shows a format in which the positional coordinates of each block that has been judged to be corresponding to the foreground edge image by the aforementioned judgment are stored.

FIG. 6C schematically shows a foreground edge image that is delineated by connecting some of the coordinates assigned to the vertices of the blocks corresponding to the foreground edge image, the coordinates being shown in FIG. 4B. As shown in FIG. 6C, the foreground edge image is approximated in the form of blocks each of which is composed of 16×16 pixels.

As set forth, the masked region specification unit 5 performs processing of judging whether each block constituting the frame picture t corresponds to the foreground edge image or the background edge image.

(Mask Unit 6)

The mask unit 6 performs mask processing by inputting the frame feature data obtained by the feature amount extraction unit 1 and information indicating the foreground edge image (blocks corresponding thereto) obtained by the masked region specification unit 5. Here, the mask processing is conducted by performing a logical operation on each pixel constituting a mask pattern and each pixel constituting the frame picture data. FIG. 7A shows edge information pieces of the frame feature data, the edge information pieces including (i) edge information pieces indicating edge groups each of which shows a slant, and (ii) edge information pieces indicating edge groups each of which does not show a slant. More specifically, out of all the edge information pieces, edge information pieces of pixels that correspond to an edge image showing a person and that show large movement amounts (i.e., pixels corresponding to the foreground edge image) do not indicate a slant (from the real-world perpendicularity). On the other hand, out of all the edge information pieces, edge information pieces of pixels that correspond to edge images showing architectural structures and that show small movement amounts (i.e., pixels corresponding to the background edge images) indicate a slant (from the real-world perpendicularity). This is because architectural structures, such as buildings, are built perpendicular to the ground, and therefore perpendicular components of such buildings should be actually perpendicular to the ground.

FIG. 7B is one example of a mask pattern that is used by the mask unit 6 to perform mask processing. The mask pattern of FIG. 7B corresponds to FIG. 6C, and shows that the foreground edge image is filled with black, whereas the background edge image is filled with white. If the logical operation is performed on the mask pattern on a block-by-block basis, then only the feature amounts associated with the foreground edge image will be extracted.

Described below is a specific procedure for generating a mask pattern. First, a mask pattern is generated by assigning a value 0000 to each pixel corresponding to the foreground edge image of the frame feature data, and a value FFFF to each pixel corresponding to the background edge image of the frame feature data. FIG. 7C shows a mask pattern obtained from the frame feature data of FIG. 5A.

Next, a logical operation (e.g., AND operation) is performed on the mask pattern and the frame feature data. FIG. 8A schematically shows a procedure for calculating, from the frame feature data and the mask pattern, masked frame feature data to be used for performing slant detection. As shown in FIG. 8A, the masked frame feature data is generated by removing, from all the edge information pieces shown in the first frame feature data of FIG. 5A, edge information pieces of pixels corresponding to the foreground edge image (including edge information pieces of pixels that correspond to both the foreground edge image and the background edge image).

After the above processing, the only things left are feature amounts of the background edge image. (Hereinafter, the separation of the foreground edge image performed by the masked region specification unit 5 and the masking of the foreground edge image performed by the mask unit 6 are both referred to as "separation of a foreground edge image" in a combined manner).

(Line Detection Unit 2)

Once the mask unit 6 has separated the foreground edge image, the line detection unit 2 detects, from the masked frame feature data shown in FIG. 8A, angular components indicating rotation angles. One method to detect angular components from picture data is to use the commonly-known Hough transform or the like. Note, angular components should be detected by first detecting lines that delineate objects shown in a frame picture, and then detecting the angular components from the frame picture in accordance with the detected lines. In order to do this, various detection algorithms, such as a method disclosed in Japanese Laid-Open Patent Application No. 2005-184685, may be used.

Instead of using the Hough transform, the inventors of the present invention used a method that employs a concentration gradient, which is a better method than the Hough transform to detect angular components from a picture. Like the Hough transform, the concentration gradient method detects slant angles using line information pieces of the image. As image features, edge information pieces of a picture are commonly used in both of the Hough transform and the concentration gradient method. The concentration gradient method is different from the Hough transform in that it takes advantage of the fact that line information pieces are shown as concentration gradients in the image. Instead of directly obtaining lines, the concentration gradient method considers lines to be an entirety of the concentration gradients. The presence of lines means that there is a relatively large difference (concentration gradient) between a pixel value of any pixel included in the lines and a pixel value of any pixel corresponding to the edge images surrounding the lines. By detecting such a difference, line information pieces, which are considered to be the entirety of the concentration gradients, are utilized.

The calculation cost of the concentration gradient method is lower than that of the Hough transform. In addition, with the concentration gradient method, the line information pieces are used as the entirety of the concentration gradients. Accordingly, the concentration gradient method is resistant to noise and can detect the slant angle in a reliable manner. Another advantage of using the concentration gradient method is that, contrary to the Hough transform with which parallelization of processing is difficult, processing can be easily parallelized. Moreover, the Hough transform requires certain measures to be taken (short lines should be removed, only long lines should be used, etc.) in order to reduce noise; hence, the Hough transform can be used only when there exist lines of a predetermined length or longer in each image. However, as the video camera 100 could be used in a wide variety of situations, it is not always the case that such lines of a predetermined length or longer are present in each image. As opposed to this, because the concentration gradient method considers the line information pieces as the entirety of the concentration gradients, the concentration gradient method does not require lines in each image to be of a predetermined length or longer. Accordingly, compared to the Hough transform, the concentration gradient method has the advantage of being able to yield stable results under any circumstances.

(Angle Estimation Unit 3)

In accordance with the lengths of the lines detected by the line detection unit 2 and angle information pieces, the angle estimation unit 3 estimates the slant angle, that is, the angle by which the picture data is slanted with respect to the real-world horizon.

First, the angle information pieces (output by the line detection unit 2 on a frame-by-frame basis) are input so as to generate a histogram showing angles at predetermined intervals. Here, for example, once the angle information pieces obtained from the lines are input in units of 1°, the angle information pieces are assembled, divided in units of 10°, and put into a histogram showing a range of −90° to 90°.

Referring to FIG. 8B, the histogram presented with chain lines is generated using a conventional method in accordance with angle information pieces obtained from picture data whose frame feature data has not been masked by a mask processing unit (i.e., the frame feature data has a foreground edge image showing large movement amounts). In this histogram, frequencies of the bars presented with the chain lines reflect edge information pieces detected from an edge image showing a person (i.e., the foreground edge image); accordingly, an angle showing the slant of the person has the highest frequency in the histogram.

Referring to FIG. 8B, the histogram presented with solid lines is generated in accordance with angle information pieces pertaining to the present invention. Here, the angle information pieces, in accordance with which the histogram is generated, are obtained from lines associated with edge components of the background edge image, which shows small movement amounts after the mask processing unit performs mask processing on frame feature data.

In the histogram presented with the solid lines in FIG. 8B, angles that are associated with edge directions shown in the edge image of the person (the first direction) have low frequencies. In contrast, an angle associated with still objects shown in the background edge image (the second direction) has the highest frequency in the histogram. Accordingly, this angle associated with the still objects (20°) can be estimated as a correct perpendicular component.

The angle estimation unit extracts the stated angle, whose frequency is the peak in the histogram (20° in this case), and outputs the stated angle to an angle correction unit as the slant angle.

The above-described line detection unit 2 and angle estimation unit 3 both detect the slant angle, which is an example of the correction parameter. Accordingly, a pair of line detection unit 2 and angle estimation unit 3 is equivalent to "a correction parameter detection unit 9".

(Slant Correction Unit 7)

The slant correction unit 7 corrects the slant shown in the frame picture t in accordance with the angle estimated by the angle estimation unit 3.

Figure 9A:
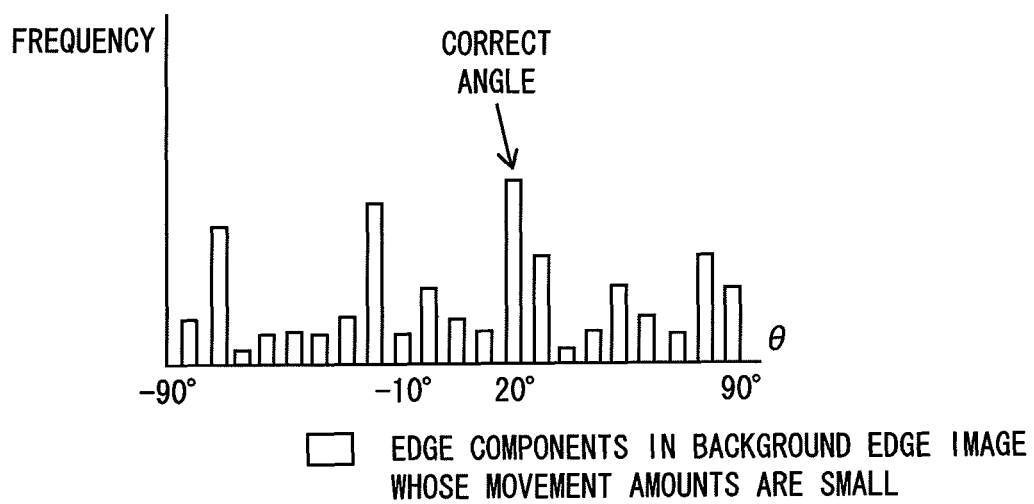
FIG. 9A shows a histogram obtained in performing angle estimation for a frame picture whose foreground edge image has been masked.
Figure 9B:
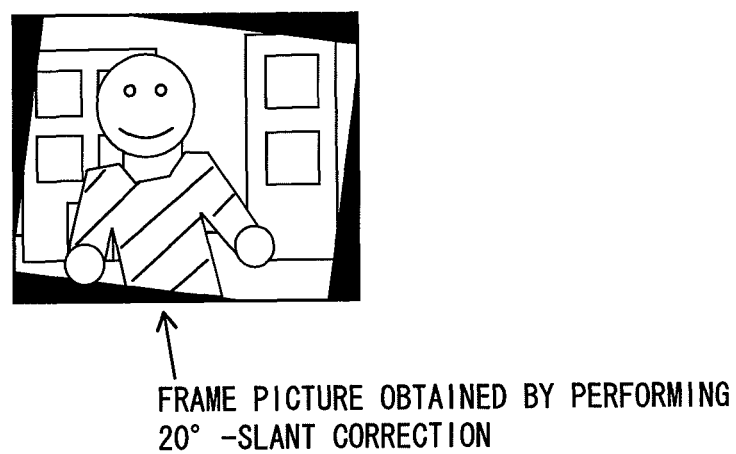
FIG. 9B shows a corrected image obtained by a correction unit 7 performing rotation correction in accordance with an estimated angle of 20°.

An Affine transformation or the like is used as a correction method. In a case where the angle estimation unit 3 estimates the slant angle for a frame feature data whose foreground edge image has been masked, a histogram of FIG. 9A will be obtained and the estimated angle will be 20°. If the slant correction unit 7 performs rotation correction in accordance with the estimated angle, then a corrected image shown in FIG. 9B will be obtained.

(Encode Unit 8)

With use of frame pictures on which slant correction has been performed by the slant correction unit 7, the encode unit 8, for example, either (i) encodes each of these frame pictures, on which the slant correction has been performed, as a still image, or (ii) encodes these successively output frame pictures, on which the slant correction has been performed, as a video. Then the encoded frame pictures or the encoded video is stored in a card drive 60.

This completes the description of the functions of the imaging apparatus and the image processing device pertaining to the present invention.

As has been stated, in the present invention, angular components indicating the angles of rotation are extracted from masked frame feature data showing edge components of a background edge image (i.e., frame feature data from which the influence of a foreground edge image has been removed). This is for increasing the probability that the slant correction is performed with reference to a reference angle, which is based on lines of the real-world architectural structures.

This way, it is possible to, for example, (i) extract a background edge image that is assumed to intrinsically show many architectural structures and thereby to show many horizontal and perpendicular component values, or (ii) remove the influence of the above-described edge components of an object (i.e., a person) shown in a relatively foreground edge image. This increases the probability that an angle correction is performed with reference to true horizontal and perpendicular lines.

(Reason Why Mask Unit 6 Performs Masking after Feature Amount Extraction)

In the above-described processing procedure, there is a reason why the mask unit 6 performs masking after the feature amount extraction unit 1 performs the feature amount extraction. If the foreground edge image is masked before the feature amount extraction, then extra pseudo outlines will be detected, the pseudo outlines being the borders that separate the foreground edge image from the background edge image; accordingly, edge information pieces associated with the pseudo outlines will be unnecessarily calculated as features to be referenced in estimating the slant angle. FIG. 8C shows edge information pieces generated for a pseudo outline delineating the border separating the foreground edge image and the background edge image.

Such edge information pieces are considered to be noise, and therefore have negative effects on a detection result. To remove such edge information pieces, firstly the feature amount extraction unit 1 performs feature amount extraction, and thereafter, the mask processing is performed on the foreground edge image and the background edge image. This way, only the edge information pieces associated with the background edge image will be used. This increases the probability that an angle correction is performed with reference to true horizontal and perpendicular components. As set forth, in order to increase the accuracy of detecting the slant angle, the mask unit 6 performs mask processing after the feature amount extraction unit 1 performs feature amount extraction.

Note, the image processing engine 50 may use DSP dedicated for video encoding as a movement detection unit. By providing movement vectors detected by this DSP to the masked region specification unit as movement amounts, the image processing device of the present invention can be realized with use of a general-purpose processor.

According to the present embodiment, in extracting the background edge image (judging whether each pixel corresponds to the foreground edge image), each of the movement amounts of the blocks, which is output by the motion vector calculation unit 4, is compared with an absolute value or a relative value. The present invention, however, is not limited to this.

Alternatively, it is permissible to use a Shape from Focus method or the like. The Shape from Focus method obtains a plurality of pictures that were taken while changing a focal length of a camera at high speed, then detects a focal position from each picture. This enables estimation of the distance between a camera and an object shown in picture data and separating the foreground edge image.

Alternatively, the foreground edge image may be separated by identifying an edge image including a geometric design, such as buildings, with the aid of a template matching technique or the like. The template matching technique separates the foreground edge image by assuming that an edge image having a high similarity to the template includes architectural structures (i.e., the background edge image).

(Modification to Embodiment 1)

Figure 10:
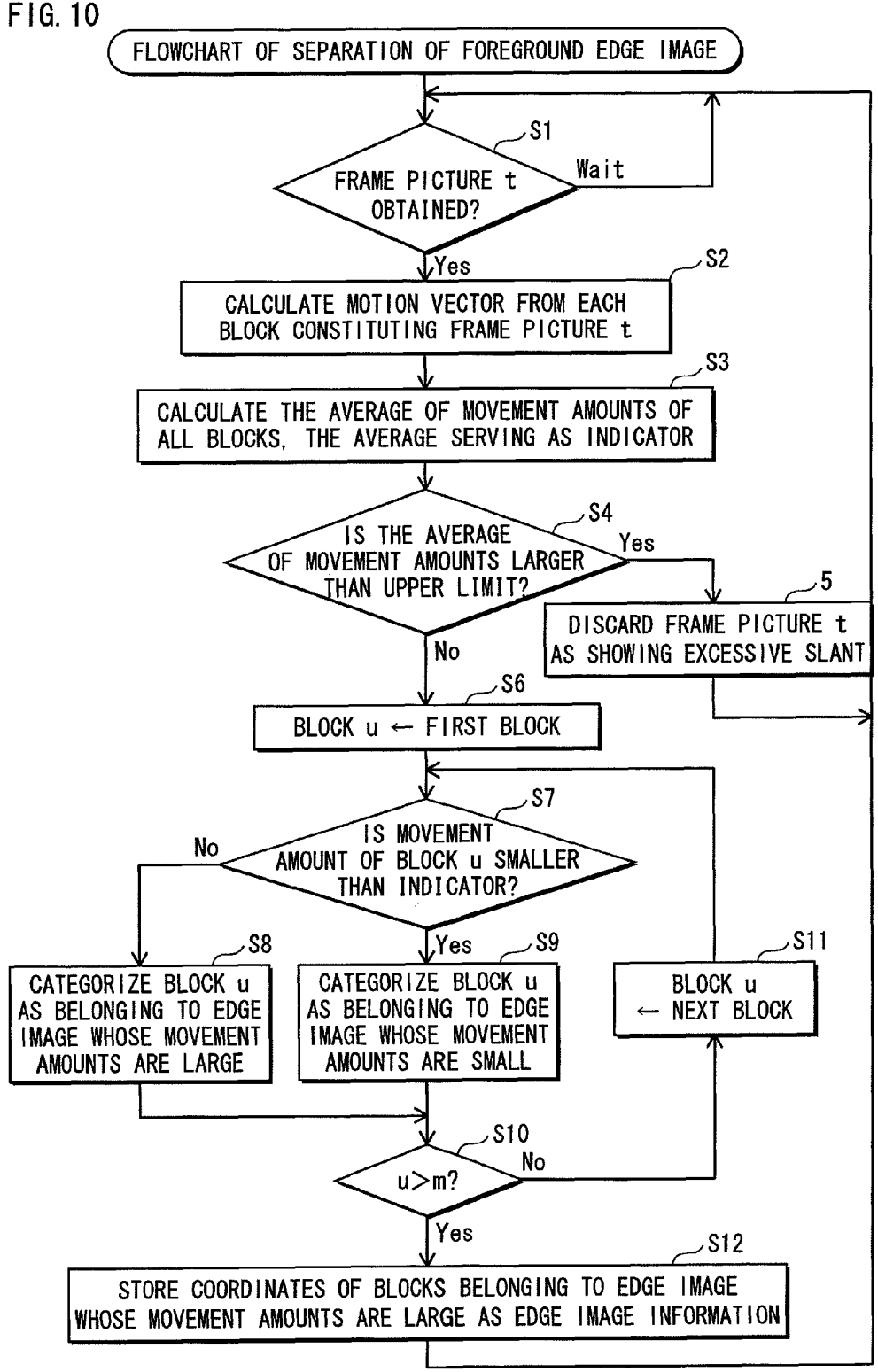
FIG. 10 is a flowchart showing processing procedures for dividing an edge image of a frame picture.
Figure 11:
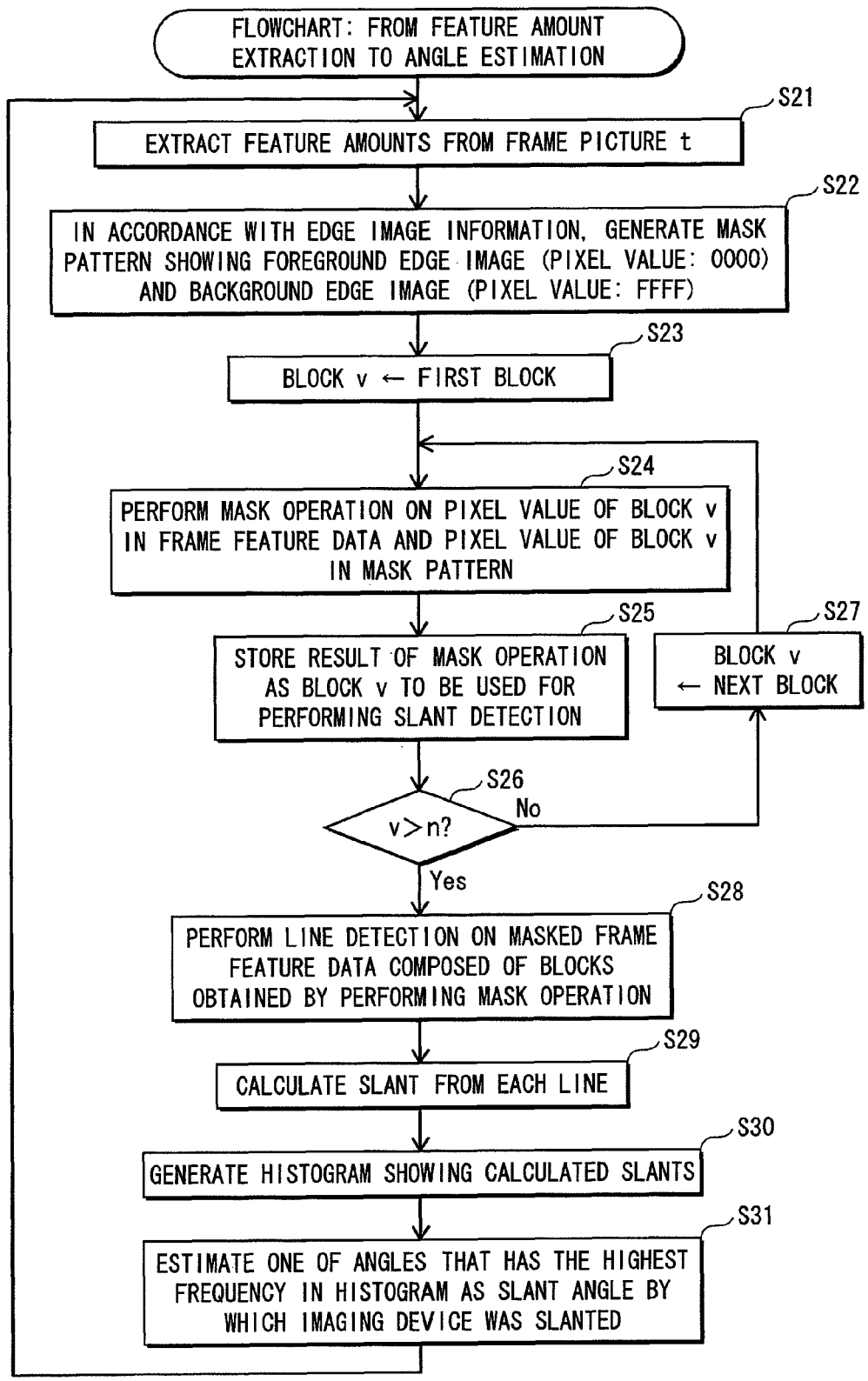
FIG. 11 is a flowchart showing processing procedures from feature amount extraction to angle estimation.

The constituent elements explained in Embodiment 1, such as the masked region specification unit, the mask unit, the line detection unit, the angle estimation unit, and the slant correction unit, can be realized as a program that makes MPU execute processing procedures shown in flowcharts of FIGS. 10 and 11.

FIG. 10 is a flowchart showing processing procedures for separating a foreground edge image from a frame feature data. FIG. 11 is a flowchart showing processing procedures from feature amount extraction to angle estimation. Referring to the flowchart of FIG. 10, processing of Step S2 is executed by the motion vector calculation unit 4, and processing of Steps S3 to S12 is executed by the masked region specification unit 5. Referring to the flowchart of FIG. 11, processing of Steps S23 to S27 is executed by the mask unit 6, processing of Step S28 is executed by the line detection unit 2, and processing of Steps S29 to S31 is executed by the angle estimation unit 3.

The following describes software processing to be executed by the video camera 100.

In a real-time operating system, the programs that realize the flowcharts of FIGS. 10 and 11 are considered as a plurality of tasks. A kernel generates tasks corresponding to these programs by loading these programs to RAM. From then on, if an interrupt occurs as a result of a user operation to start imaging processing, tasks will be preempted. And once the tasks are preempted, the processing of FIG. 10 is initiated.

Referring to the flowchart of FIG. 10, Step S1 forms a loop and will not be executed until a frame picture is obtained. Once the frame picture is obtained, processing of Steps S2 to S12 will be executed next. Here, a motion vector is calculated from each block constituting the frame picture t (Step S2). Then, after the average value of the motion vectors obtained from the blocks is calculated, the calculated average value is regarded as an indicator (Step S3). Thereafter, the judgment of Step S4 is conducted, and loop processing of Steps S6 to S11 is executed.

In Step 4, the masked region specification unit 5 judges whether or not the average value of the movement amounts, which has been calculated as the indicator, is greater than a predetermined upper limit. When the average value is greater than the predetermined upper limit, it means that the corresponding frame picture looks excessively slanted as the video camera 100 was shaken violently. In this case, the masked region specification unit 5 discards the frame picture t stored in the frame memory 30 (Step S5) and waits until the next frame picture is taken. Due to the presence of the above Steps S4 and S5, the slant correction will not be performed on a frame picture that looks excessively slanted as a whole. This, the slant correction will be performed on a frame picture that includes decent foregrounds and backgrounds.

Step 4 is followed by another loop processing. Here, out of all the blocks constituting a frame picture, a block positioned in the upper left corner of the frame picture (i.e., the first block) is designated as a block u (Step S6). After Step S6, processing of Steps S7 to S11 is repeated.

In processing of Steps S7 to S11, the masked region specification unit 5 first judges whether or not the movement amount of the block u is smaller than the indicator (Step S7). If the movement amount of the block u is judged to be smaller than the indicator, then the block u is categorized as corresponding to the background edge image (Step S8). If the movement amount of the block u is judged to be greater than the indicator, then the block u is categorized as corresponding to the foreground edge image (Step S9). After Step S10, the next block is newly designated as a block u (Step S11). The above Steps S7 through S11 constitute a sequence of processing.

An end-of-loop condition for the above loop processing is defined in Step S10. The above loop processing is repeated until the variable u exceeds the total number of the blocks m. If the variable u exceeds m, then the above loop processing is terminated, and the coordinates of the blocks corresponding to the foreground edge image are stored as edge image information (Step S12). Thereafter, the processing of Step 1 will be executed for the next round.

The following is a description of the processing shown in FIG. 11. In the flowchart of FIG. 11, after feature amount extraction is performed on the frame picture t (Step S12), a mask pattern is generated in which the blocks corresponding to the foreground edge image are each expressed by a 32-bit pixel value 0000, and the blocks corresponding to the background edge image are each expressed by a 32-bit pixel value FFFF (Step S22). Step S22 is followed by loop processing of Steps S23 to S27. According to this flowchart, a block positioned in the upper left corner of the frame picture (i.e., the first block) is designated as a block v (Step S23). After Step S23, processing of Steps S24 to S27 is repeated. First, in order to perform mask processing, a logical operation is performed on the pixel value of the block v in the frame picture data and the pixel value of the block v in the mask pattern (Step S24). Then, a result of the logical operation is stored as the block v to be used in detecting a slant (Step S25), and the next block is newly designated as a block v (Step S27). The processing of Steps S24 to S27 is repeated until the variable v exceeds the total number of the feature amounts n (Step S26).

The processing of the above loop is performed on each block included in the frame picture (i.e., from the block positioned in the upper left corner of the frame picture to the block positioned in the bottom right corner of the same). Once such processing is completed, the masked frame feature data composed of blocks obtained by performing the logical operation is acquired. The line detection unit 2 detects lines from the masked frame feature data (Step S28). The angle estimation unit 3 calculates a slant of each line (Step S29), obtains a histogram showing each slant calculated (Step S30), and estimates that an angle having the highest frequency in the histogram is the slant angle shown in the picture taken by the imaging device 10 (Step S31). Then the processing of Step 21 will be executed for the next round.

As has been described above, according to the present embodiment, the foreground edge image is separated in accordance of magnitudes of motion vectors indicating interframe movements, and only the image features calculated from the background edge image are used for detecting the slant angle. This makes it possible to estimate the slant angle and perform slant correction in accordance with the estimated angle with high accuracy, even when a person shown in each picture takes a lot of space therein.
(Embodiment 2)

Figure 12:
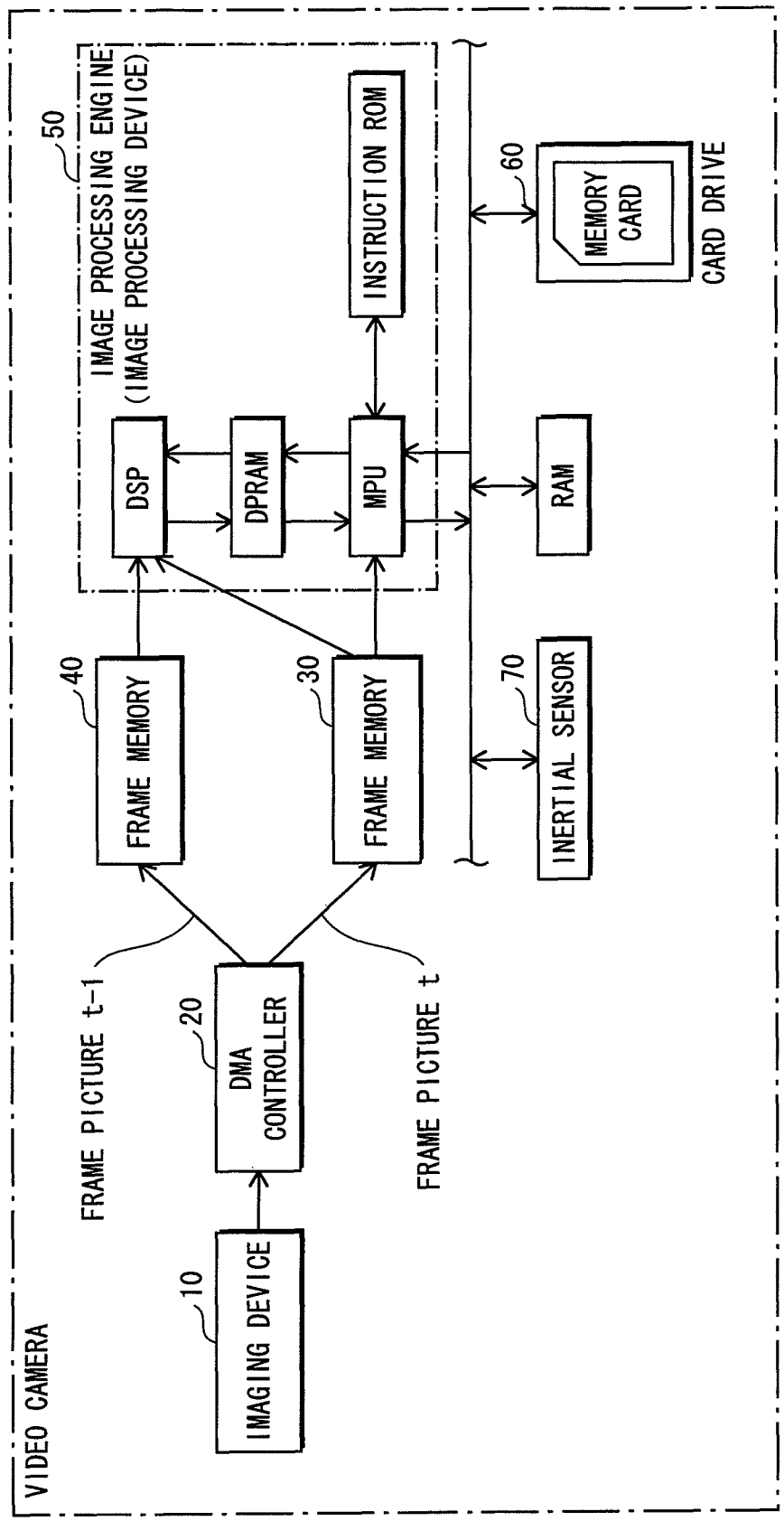
FIG. 12 shows a hardware structure of an image processing device pertaining to Embodiment 2.

FIG. 12 shows a hardware structure of an image processing device pertaining to Embodiment 2 of the present invention. Some constituent elements shown in FIG. 12 are configured the same as their counterparts in FIG. 11; these constituents elements are labeled the same reference numbers as their counterparts in FIG. 12, and the descriptions thereof are omitted.

As shown in FIG. 12, Embodiment 2 of the present invention is different from Embodiment 1 of the same in that (i) there is an additional constituent element, i.e., an inertial sensor 70 that can detect angular components associated with angles around a roll axis, and (ii) the line detection unit 2 utilizes an output from the sensor 70. Examples of such an inertial sensor 70, which can detect the angular components associated with the angles around the roll axis, include an acceleration sensor and a gyroscope.

The inertial sensor 70 obtains the slant angle around the roll axis which was measured at time t, i.e., when the imaging device 10 took the frame picture t. Here, the value of the slant angle may be an actual value that is directly output by the inertial sensor 70, or a value that has been corrected using some sort of scheme.

This completes the description of the inertial sensor 70.

The following describes improvements made to the line detection unit 2 in Embodiment 2.

The line detection unit 2 generates a histogram in accordance with the lengths of the lines and the angle information pieces obtained using a slant angle detection method. Here, the histogram is generated such that it shows a limited range of angles, based on the range of angles output by the inertial sensor 70. Accordingly, the slant angle is estimated from the histogram having the limited range of angles.

When the casing of the video camera 100 or the like, which is performing imaging processing, is moving, the value output by the sensor (herein after, "sensor value") may be different from an actual slant angle, due to the influence of inertia. Therefore, a range including the obtained value ±X° is regarded as a range including the actual slant angle at the time of taking the frame picture t. Accordingly, the histogram is generated in accordance with the lines that are detected using the slant angle detection method, such that the histogram shows a limited range of angles that can be determined from the stated sensor value. The slant angle is estimated from the limited range of angles.

Figure 13A:
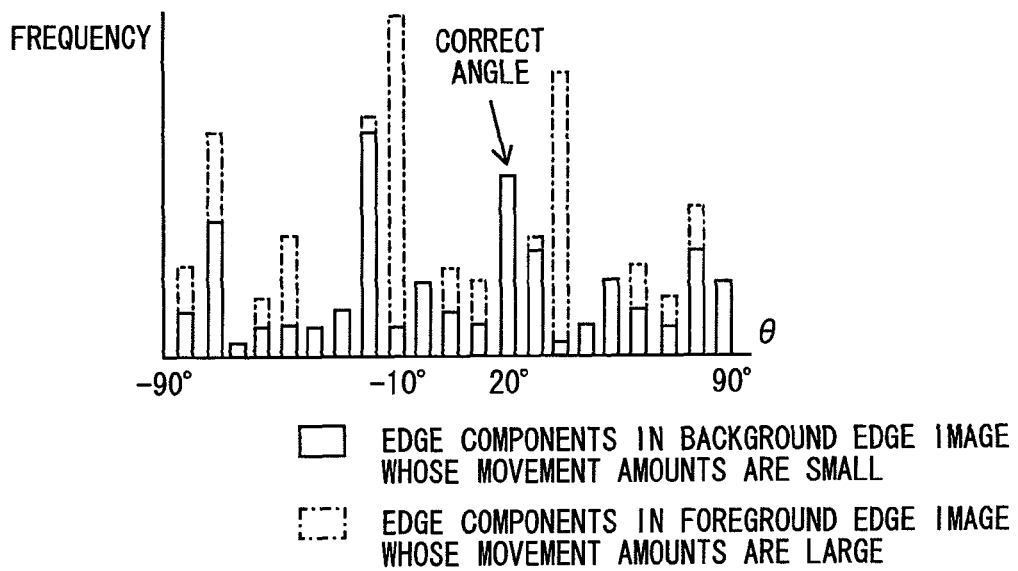
FIG. 13A shows a histogram obtained by separating a foreground edge image.
Figure 13B:
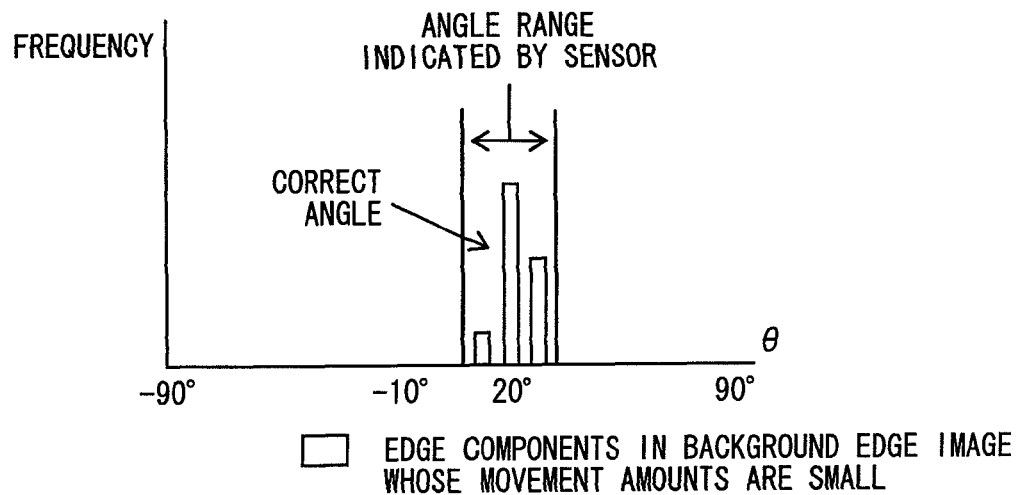
FIG. 13B shows a range from which angle estimation is performed, the range being limited in accordance with a sensor value.

FIG. 13A shows a histogram obtained by separating the foreground edge image. Although the correct slant angle is 20°, an angle of −10° is shown as the peak of this histogram. Therefore, the correct slant angle cannot be estimated from such a histogram. FIG. 13B shows a range from which angle estimation is performed, the range being limited in accordance with the sensor value. Once a range from which angle estimation is to be performed is limited in accordance with the sensor value, the correct angle (20°) should have the highest frequency. A correct image can be obtained by performing slant correction in accordance with the correct angle.
(Embodiment 3)

The present embodiment relates to improvements made in a case where the coordinates in which a camera holder is positioned move. The coordinates in which the camera holder is positioned move when, for example, he/she is taking a picture from a moving vehicle, for example, a car. In such a case, there are times when the movement amounts that are calculated from an edge image showing architectural structures seem relatively large in the picture taken. Here, if the judgment of determining an edge image based on which the error correction should be performed is made in the same manner as Embodiment 1, i.e., merely in accordance with magnitudes of motion vectors, the edge image showing the architectural structures may be misjudged to be a foreground edge image. In this case, the slant angle cannot be obtained from feature amounts of the edge image showing the architectural structures, and accordingly, it is ineffective to use the above-described scheme of estimating the slant angle from a background edge image.

With this problem in mind, the present embodiment aims to (i) obtain, from each of a background edge image and a foreground edge image, a histogram showing a range of slant angles that are present in picture data, (ii) calculate a level of reliability (hereafter, "reliability level") for each of the background edge image and the foreground edge image, then (iii) select the higher one of the two reliability levels and use a slant angle obtained from the edge image having the selected higher reliability level as a correction parameter.

Figure 14A:
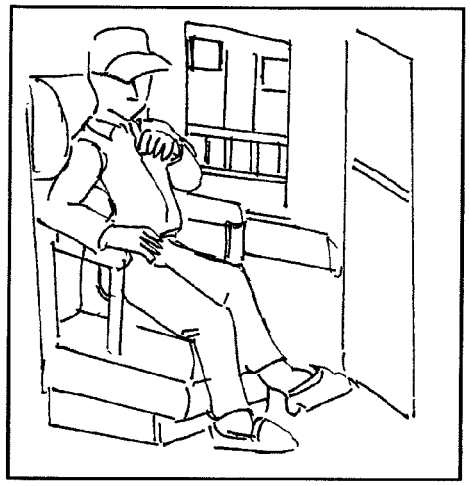
FIG. 14A shows frame picture data on which slant estimation processing of Embodiment 3 is to be performed, the frame picture data being of a frame picture taken on a bus.

The following describes how slant estimation is performed in the present embodiment, with reference to FIGS. 14A through 15.

Figure 14B:
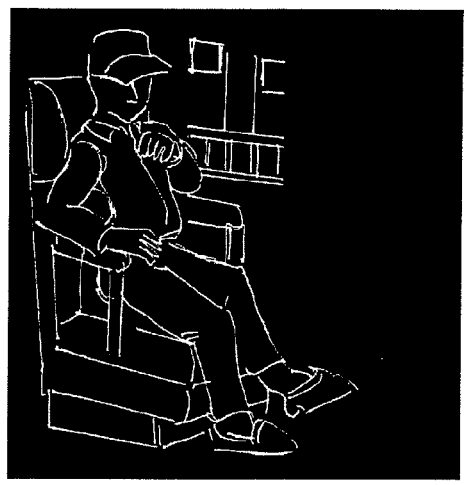
FIG. 14B shows frame feature data obtained by extracting feature amounts from the frame picture data of FIG. 14A.

FIG. 14A shows frame picture data on which slant estimation processing of Embodiment 3 is to be performed, the frame picture data being of a picture taken on a bus. To perform slant estimation processing on such frame picture data, frame feature data shown in FIG. 14B should be obtained by extracting feature amounts from said frame picture data. FIG. 14B shows frame feature data obtained by extracting feature amounts from the frame picture data of FIG. 14A. In Embodiment 1, after separating a foreground edge image from the frame feature data obtained in the above manner, mask processing is performed on the separated foreground edge image. As opposed to this, in the present embodiment, mask processing is performed on both of (i) the foreground edge image, which is obtained by separating the same from the frame feature data, and (ii) a background edge image, which is the rest of the frame feature data.

Figure 14C:
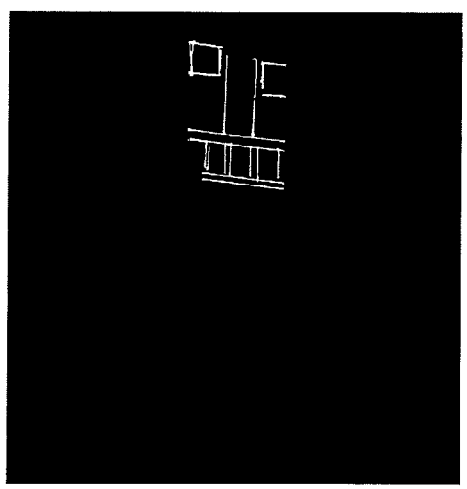
FIG. 14C shows masked frame feature data obtained by masking the foreground edge image of the frame feature data.
Figure 14D:
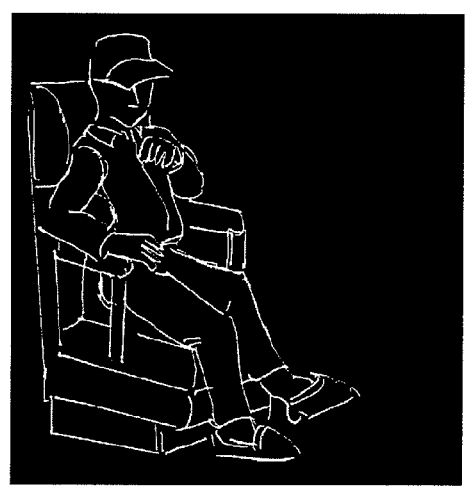
FIG. 14D shows masked frame feature data obtained by masking the background edge image of the frame feature data.

FIG. 14C shows masked frame feature data obtained by masking the foreground edge image of the frame feature data. FIG. 14D shows masked frame feature data obtained by masking the background edge image of the frame feature data. A histogram is generated from each of (i) the masked frame feature data with the foreground edge image masked and (ii) the masked frame feature data with the background edge image masked. Once the histograms are generated, a range of angles shown in each histogram is limited.

FIG. 15 shows the masked frame feature data pieces and the histograms generated therefrom. Out of the two histograms, one shows an angle range α1 including angles around 80°, and the other shows an angle range α2 including angles around 90°. The angle range α1 is a range of angles obtained from the lines that are detected from an exterior view that is moving behind the bus window. The angle range α2 is a range of angles obtained from the lines that are detected from the seat and the passenger on the bus. Under the above assumptions, a reliability level is calculated for each of the angle ranges α1 and α2. In the angle range α1, the frequency of an angle of 80° is extremely high, whereas the frequencies of other angles around 80° are low. The angle range α1 is leptokurtic with a peak at an angle of 80°, i.e., angles are narrowly distributed. That is to say, the reliability level of the angle range α1 is high. On the other hand, in the angle range α2, the frequencies of angles of/around 80° are very similar to one another, meaning that angles are widely distributed. That is to say, the reliability level of the angle range α2 is low. In this case, these reliability levels establish the following relationship: the background edge image>the foreground edge image. Accordingly, one of the angles included in the angle range α1 is selected as a correction parameter.

As stated above, an angle range that includes slant angles obtained from architectural structures shows a variety of slant angles with respect to the real-world horizon. Such an angle range is leptokurtic and therefore has a high reliability level. On the other hand, in an angle range that includes slant angles obtained from objects other than architectural structures, different angles are widely distributed. Accordingly, the reliability level of such an angle range is low.

This completes the description of an overview of processing procedures for estimating the slant angle based on reliability levels.

Described below is an internal structure of an image processing device pertaining to Embodiment 3.

Figure 16:
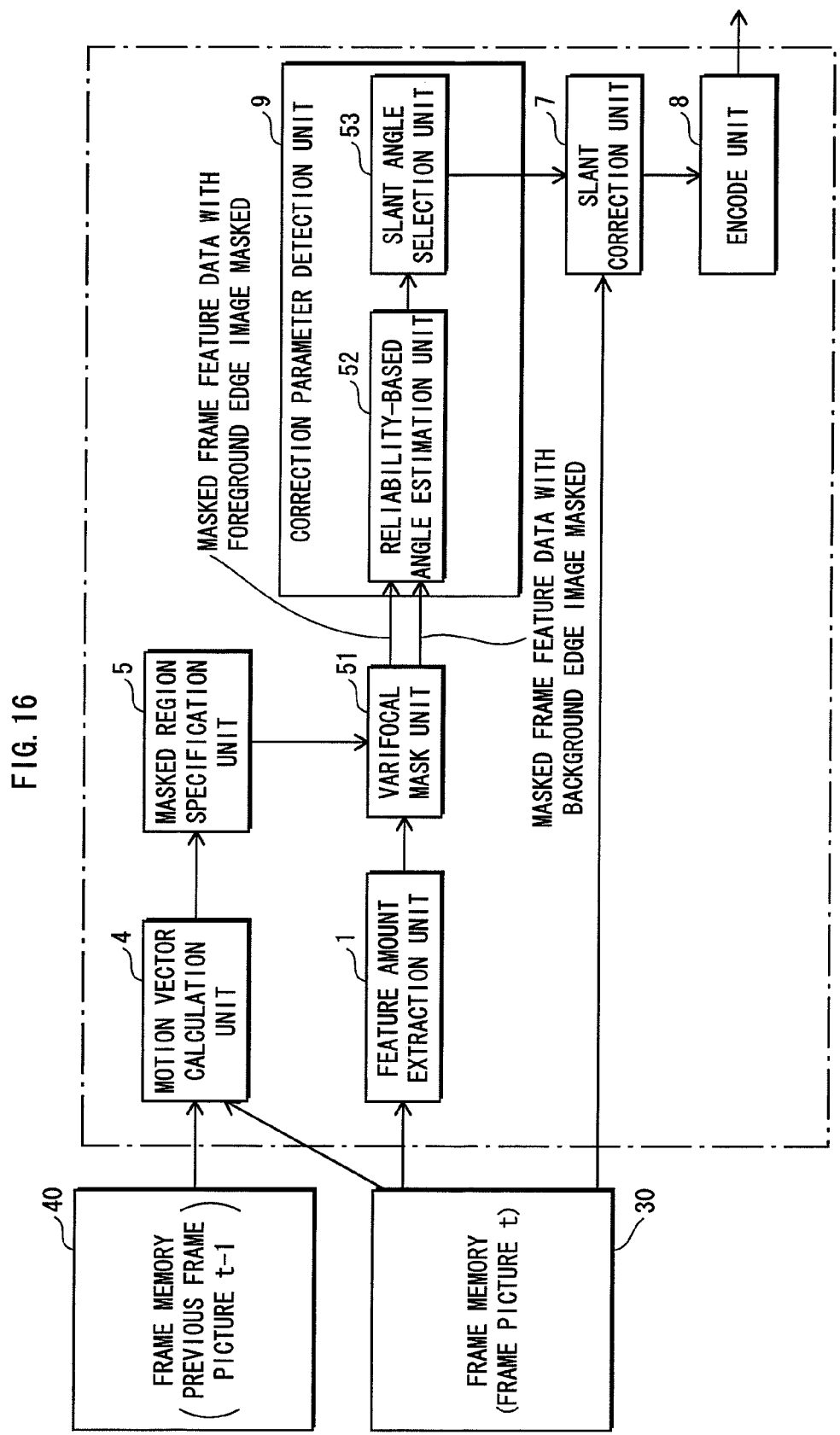
FIG. 16 shows an internal structure of an image processing device pertaining to Embodiment 3.

FIG. 16 shows the internal structure of the image processing device pertaining to Embodiment 3. FIG. 16 is derived from FIG. 3. The internal structure of FIG. 16 is different from the structure of FIG. 3 in that the mask unit 6 is replaced by a varifocal mask unit 51, and the line detection unit 2 and the angle estimation unit 3 are replaced by a reliability-based angle estimation unit 52 and a slant angle selection unit 53, respectively. Out of the constituent elements shown in FIG. 16, those that are also shown in FIG. 3 are labeled the same reference numbers as their counterparts in FIG. 3, and the descriptions thereof are omitted.

(Varifocal Mask Unit 51)

The varifocal mask unit 51 performs (i) mask processing for retrieving only the background edge image and (ii) mask processing for retrieving only the foreground edge image. By retrieving the background edge image and the foreground edge image separately, a slang angle can be detected from each of the background edge image and the foreground edge image.

(Reliability-Based Angle Estimation Unit 52)

By using the above-mentioned Hough transform or concentration gradient method, the reliability-based angle estimation unit 52 estimates a slang angle from each of the background edge image and the foreground edge image retrieved by the varifocal mask unit 51. Here, the reliability-based angle estimation unit 52 calculates a reliability level for each of the background edge image and the foreground edge image, the reliability level indicating how accurate the estimated slant angle is. Once a histogram showing slant angles is generated, in the course of judging that an angle having the highest frequency in the angle range determined with the help of the sensor is the slant angle, a reliability level serves as an indicator that indicates how peaked the estimated slant angle is in the histogram.

(Slant Angle Selection Unit 53)

The slant angle selection unit 53 compares the reliability levels of the slant angles obtained from the background edge image and the foreground edge image, the reliability levels being calculated by the reliability-based angle estimation unit 52. Because the slant angle obtained from an edge image showing architectural structures is highly peaked in the corresponding histogram, and because such a slang angle is supposed to have a high reliability level, the slant angle selection unit 53 selects, from the two slant angles obtained from the foreground and background edge images, a slang angle having a higher reliability level than the other as a correct slant angle. In a case where slant angles are obtained from three edge images or more, the slant angle selection unit 53 selects, from all the slant angles calculated, a slang angle having the highest reliability level as the correct slant angle.

Described below is processing performed by the image processing device for selecting a correction parameter in accordance with reliability levels.

In the above structure, the reliability-based angle estimation unit 52 obtains a reliability-based slant angle from each of the background edge image and the foreground edge image. A reliability level of an angle obtained from an edge image showing no architectural structures is lower than a reliability level of an angle obtained from an edge image showing architectural structures. Therefore, by comparing different reliability levels with each other, it is possible to dynamically select an edge image in accordance with which slant correction should be performed. With the slant angle selection unit 53 selecting a slang angle based on reliability levels in the above-described manner, an edge image showing architectural structures can be selected and provided for use, even if a camera holder, or the coordinates in which he/she is positioned, had moved. This way a slang angle can be estimated with high accuracy.

Figure 17:
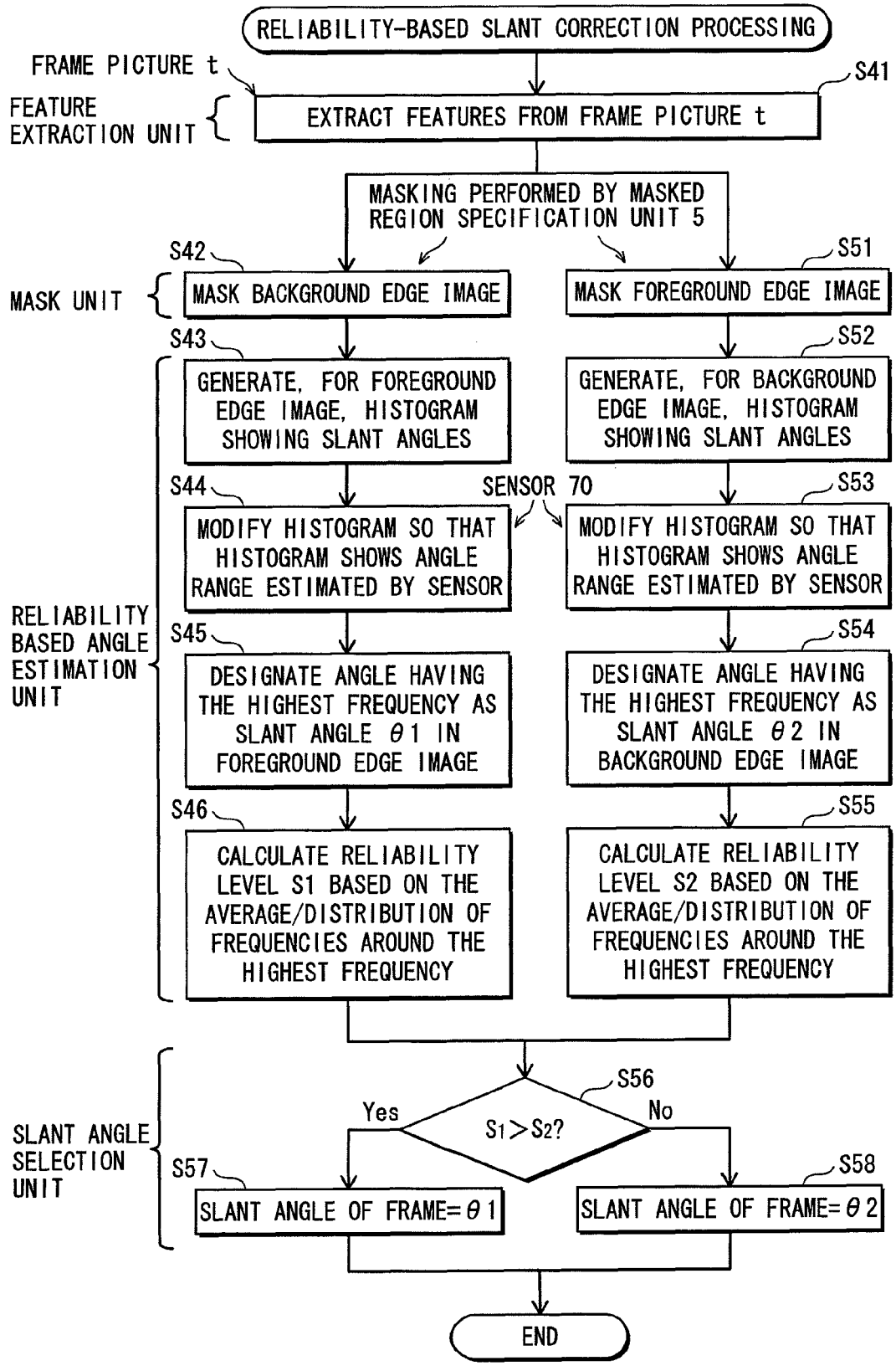
FIG. 17 is a flowchart showing processing procedures for performing reliability-based slant correction processing of Embodiment 3.

FIG. 17 is a flowchart showing processing procedures for performing reliability-based slant correction processing pertaining to Embodiment 3. The constituent elements that are assigned to perform Steps of the flowchart are also indicated with use of curly brackets "{" shown on the left side of FIG. 17. The feature amount extraction unit 1 is assigned to perform Step S41; the varifocal mask unit 51 is assigned to perform Step S42; the reliability-based angle estimation unit 52 is assigned to perform Steps S43 through S46 and S51 through S55; and the slant angle selection unit 53 is assigned to perform Steps S56 through S58.

The following describes Steps shown in the above flowchart. In Step S41, feature extraction is performed on a frame picture. In accordance with a result of this feature extraction, processing of calculating a reliability level S1 of the foreground edge image (Steps S42 through S46) and processing of calculating reliability level S2 of the background edge image (Steps S51 through S55) are executed in parallel. Once the reliability level S1 of the foreground edge image and the reliability level S2 of the background edge image are obtained, the slant angle selection unit 53 judges whether or not the reliability level S1 is higher than the reliability level S2 (Step S56). Then a slang angle is determined in accordance with on a result of this judgment (Steps S57 and S58).

The following describes processing performed in association with the foreground edge image. After the background edge image is masked in Step S42, a histogram is generated in Step S43, the histogram showing a frequency distribution of slant angles obtained from the foreground edge image. In Step S44, a part of the histogram is retrieved in accordance with the angle range estimated by the inertial sensor 70. In Step S45, the angle having the highest frequency is designated as a slang angle $\theta1$ in the foreground edge image. In Step S46, the reliability level S1 is obtained based on the average/distribution of the frequencies of angles around the angle having the highest frequency.

The following describes processing performed in association with the background edge image. After the foreground edge image is masked in Step S51, a histogram is generated in Step S52, the histogram showing slant angles obtained from the background edge image. In Step S53, a part of the histogram is retrieved in accordance with the angle range estimated by the inertial sensor 70. In Step S54, the angle having the highest frequency is designated as a slang angle $\theta2$ in the background edge image. In Step S55, the reliability level S2 is obtained based on the average/distribution of the frequencies of angles around the angle having the highest frequency.

If the reliability levels S1 and S2 obtained in the above manner satisfy the relationship S1>S2 (Yes of Step S56), then the slant angle $\theta1$ will be used as the slant angle in the frame featured at a (Step S57). If the reliability levels S1 and S2 satisfy the relationship S2>S1 (No of Step S56), then the slant angle $\theta2$ will be used as the slant angle in the frame feature data (Step S58).

As has been described above, according to the present embodiment, one edge image of a frame feature data is separated from another edge image of the frame feature data in accordance with magnitudes of motion vectors indicating inter-frame movements. By using an angle detection method, a reliability level and a slang angle are calculated from each of the separated edge images in accordance with features of the separated edge images. Then, out of the calculated slant angles, one having the higher reliability level than the other will be selected and used for performing the slant correction processing. This makes it possible to dynamically select/detect a slang angle from an edge image showing architectural structures, even in a case where (i) the camera holder himself/herself was moving and (ii) the coordinator in which the camera holder was positioned was moving.

(Fourth Embodiment)

The above embodiments have described how the slant correction is performed in accordance with movement amounts. As opposed to the above embodiments, the present embodiment features image stabilization that fixes a shake shown in a picture. Here, the shake means a movement of the camera caused by the act of following an object to be imaged, and denotes a larger movement than a camera shake.

Image stabilization is a technique to stabilize backgrounds of consecutive frames in such a manner that pairs of coordinates in one frame are each placed in the same position as its counterpart in other frames. FIG. 18A shows examples of consecutive frames on which image stabilization is to be performed. Picture data pieces of these consecutive frames constitute a video that was taken with the camera following a horse galloping at a racetrack. Here, as imaging processing was performed with the camera following the horse, the position of a vertical column shown in the background edge image of the frame feature data t-1 shows a not able difference from that of the frame picture t. When playing back such a video in which the position of the vertical column in the background edge image changes from one frame to another, the vertical column looks different in each frame. If the viewer watches such a video, he/she may develop motion sickness, i.e., "simulation sickness".

If the camera operator takes a video with a video camera while walking, the images of the video will be slanted, and the video camera will be shaken in accordance with the movement of the camera operator. As the resulting video accordingly shows the shake, it will be a pain to watch such a video. Along with the practical application of hands-free shooting, it is necessary to perform image stabilization to prevent the stated simulation sickness.

Referring to FIG. 18A, the vertical column is commonly shown in both of (i) picture data of the frame picture t-1 and (ii) picture data of the frame picture t. The background edge images can be stabilized by placing each pair of coordinates included in the vertical column of the frame picture t-1 in the same position as its counterpart included in the vertical column of the frame picture t. In the vertical column shown in the picture data of the frame picture t, there exist two feature points whose coordinates are respectively (X1,Y1) and (X2,Y2). Meanwhile, in the vertical column shown in the picture data of the frame picture t-1, there also exist two feature points whose coordinates are respectively (X4,Y4) and (X5,Y5). Here, as shown in FIG. 18B, a rotation matrix R is calculated for transforming (X4,Y4) and (X5,Y5) in the picture data of the frame picture t-1, such that the positions of (X4,Y4) and (X5,Y5) respectively match with the positions of (X1,Y1) and (X2,Y2) in the picture data of the frame picture t. Calculation of the rotation matrix R will be herein referred to as "estimation of an amount of shake (hereafter, 'shake amount')". Once the shake amount is estimated, i.e., the rotation matrix R is calculated, pixels constituting the picture data of the frame picture t-1 are each transformed in accordance with the rotation matrix R, such that the pairs of coordinates in the vertical column of the frame picture t-1 are respectively matched with the pairs of coordinates in the vertical column of the frame picture t. Once the above processing is performed, the resulting consecutive frames would not cause the viewer to develop simulation sickness.

FIG. 18C shows an example of the frame picture t-1 on which the image stabilization has been performed. As shown in this result of image stabilization, the pairs of coordinates in the vertical column shown in the picture data of the frame picture t-1 are respectively placed in the same positions as their counterparts in the frame picture t. Although there is a blank space on the right side of the frame picture t-1, playing back the video including such a frame picture t-1 would not cause the viewer to develop simulation sickness. In the video obtained in the above-described manner, an object moves over stabilized backgrounds. In such a video, the signal-to-noise ratio is high because the signal level is increased while the noise is reduced.

For details of image stabilization, the following document should be referenced.

"Robust and Real-time Rotation Estimation of Compound Omnidirectional Sensor (2007 IEEE International Conference on Robotics and Automation, Rome, Italy, 10-14 Apr., 2007)", "III. MOTION AND MOTION COMPUTATION OF DISTANT FEATURE POINTS"

The following briefly describes the principle of image stabilization.

In order to estimate an inter-frame shake amount, it is necessary to detect a movement of the camera between time t and time t-1. To accurately detect such an inter-frame shake amount from image information pieces, pairs of coordinates that are commonly present in both of the frames (i.e., (X1, Y1), (X2,Y2), (X4,Y4) and (X5,Y5) shown in FIGS. 18A through 18C) need to be obtained. One or more features that are commonly and reliably present in both of the frame pictures t-1 and t, such as the above-mentioned (X1,Y1), (X2, Y2), (X4,Y4) and (X5,Y5), are referred to as "shake features (t-1,t)". Also, points representing such shake features (t-1, t) are referred to as "feature points".

In order for such shake features (t-1,t) to be detected, the entire edge image of frame feature data should be divided into two large edge images: an edge image showing an object that is close to the camera in distance; and an edge image showing an object that is far from the camera in distance. The edge image of the object that is far from the camera in distance shows small inter-frame movements; accordingly, the shake features (t-1,t) can be reliably detected from such an edge image. On the other hand, the foreground edge image shows large inter-frame movements; accordingly, it is difficult to reliably detect the shake feature (t-1,t) from the foreground edge image.

In light of the above, the present embodiment aims to perform mask processing after separating a foreground edge image from each of the frame feature data pieces t-1 and t. FIGS. 19A to 19C show shake features (t-1,t) obtained after masking the foreground edge images. FIG. 19A shows frame feature data pieces that have been respectively generated for the frame pictures t-1 and t. FIG. 19B shows masked frame feature data pieces obtained by masking the foreground edge images of the frame feature data pieces t-1 and t shown in FIG. 19A. With the foreground edge images masked, the frame feature data pieces t-1 and t of FIG. 19B merely show the background edge images each showing the vertical column. This makes it easy to compare the frame picture t-1 with the frame picture t. FIG. 19C shows feature points detected from the masked frame feature data pieces of the frame pictures t-1 and t. With each foreground edge image (i.e., an edge image showing by the horse and the jockey) masked, the masked frame feature data pieces of FIG. 19C merely show the background edge images each showing the vertical column. It is therefore easy to detect shake features (t-1,t) from the masked frame feature data pieces.

Each foreground edge image (i.e., the edge image showing the horse and the jockey) can be specified by the masked region specification unit pertaining to Embodiment 1. Accordingly, the motion vector calculation unit 4, the masked region specification unit 5, and the mask unit 6 pertaining to Embodiment 1 can be used to efficiently detect shake features (t-1,t).

Image stabilization for removing the inter-frame shake can be performed by rotating the frame picture t by the inverse amount of the detected inter-frame movement amount.

Figure 20A:
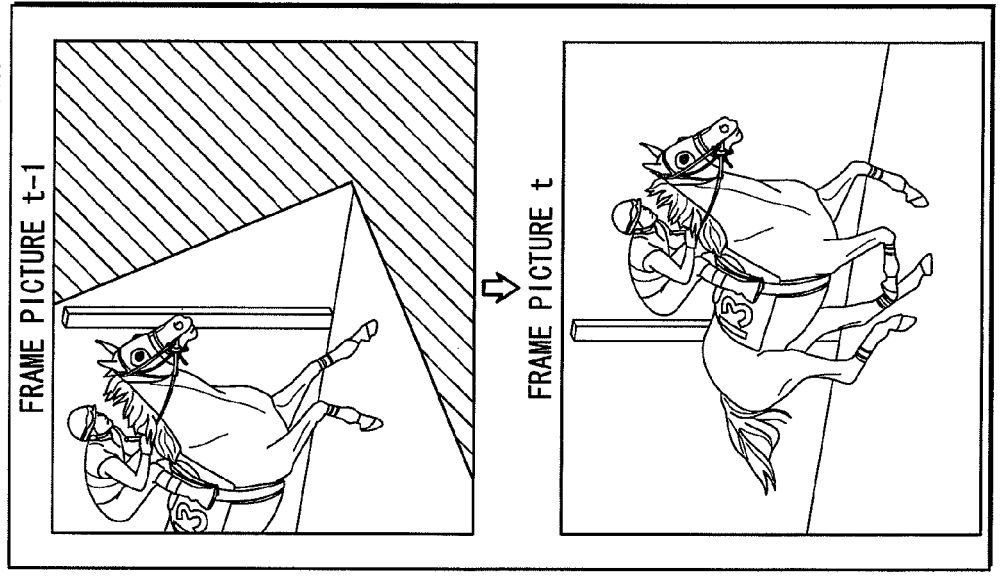
FIGS. 20A and 20B show a comparison between (i) two frame picture data pieces on which image stabilization has not been performed and (ii) two frame picture data pieces on which image stabilization has been performed.
Figure 20B:
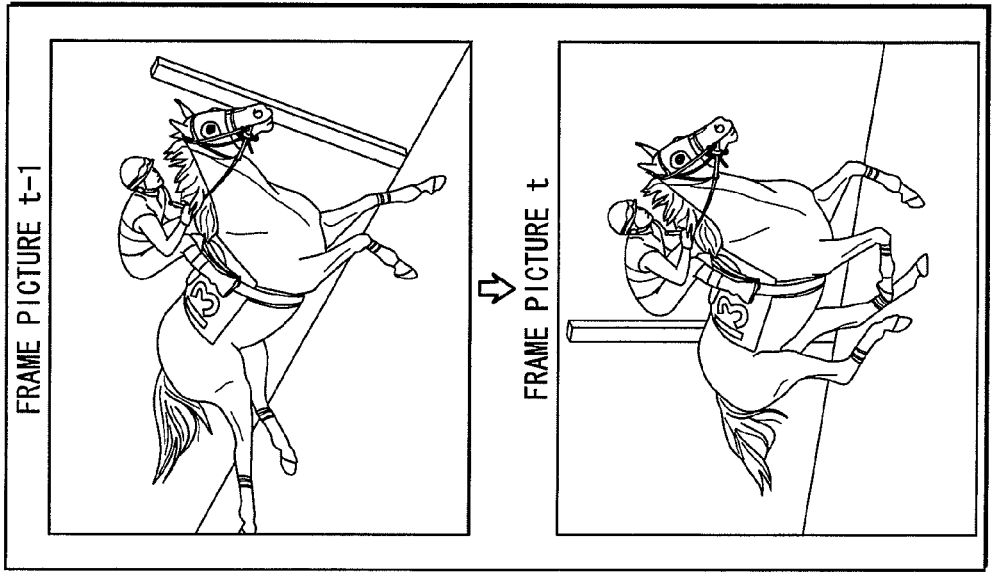

FIGS. 20A and 20B show a comparison between (i) two frame picture data pieces obtained without performing image stabilization and (ii) two frame picture data pieces obtained by performing image stabilization. Referring to FIG. 20A, the ground and the vertical column show a significant movement between the frame pictures t-1 and t. These frame pictures may cause a viewer to develop simulation sickness. As opposed to this, referring to FIG. 20B, the ground and the vertical column are stabilized in the same positions in both of the frame pictures t-1 and t. These frame pictures would not cause the viewer to develop simulation sickness. If this processing is performed on the frame picture data pieces that were taken at an interval of 10 seconds, 20 seconds, or the like, then the resulting video can be played back in a very eye-friendly manner.

Figure 21:
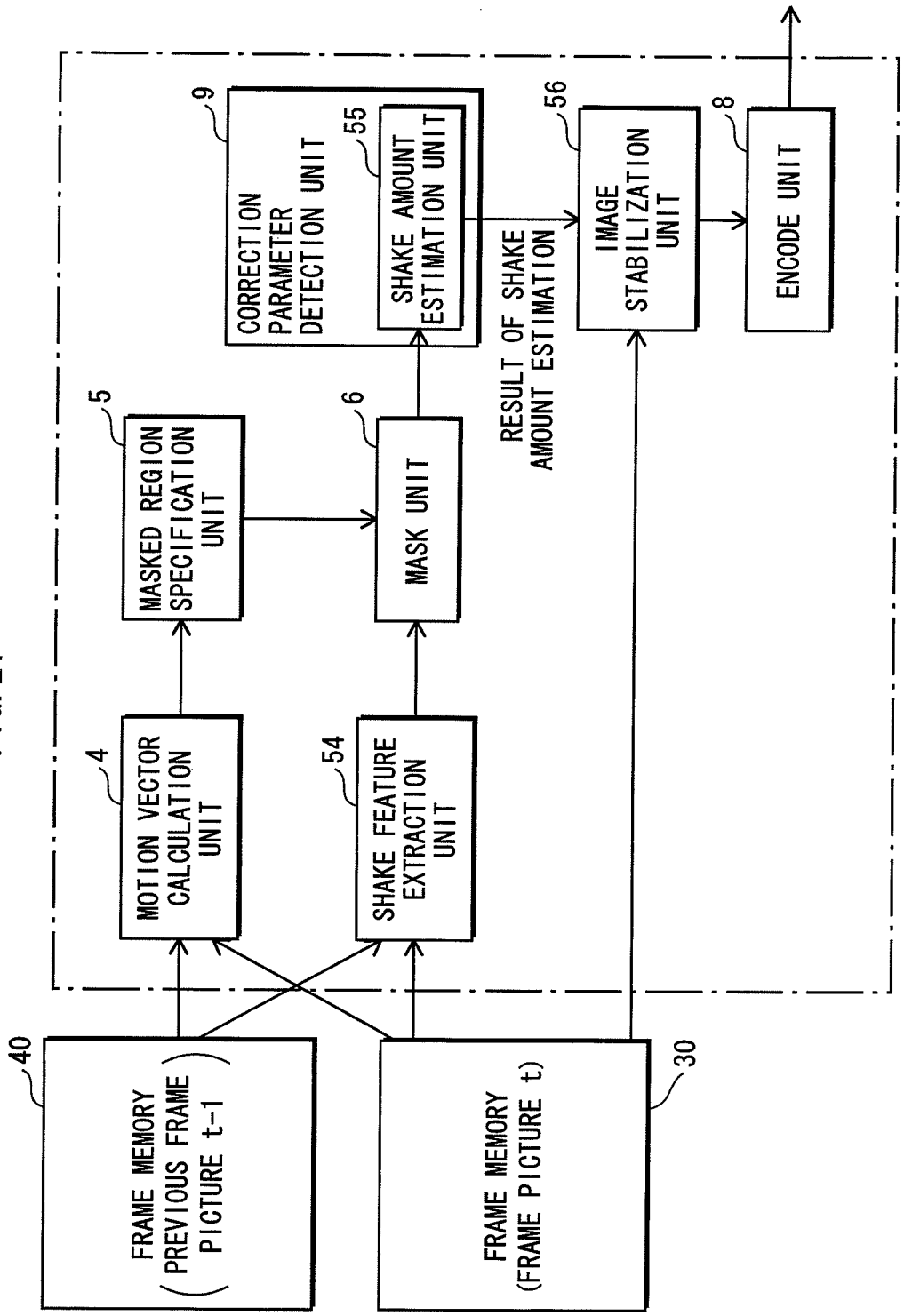
FIG. 21 shows an internal structure of an image processing device pertaining to Embodiment 4.

FIG. 21 shows an internal structure of an image processing device pertaining to Embodiment 4. FIG. 21 is derived from FIG. 3. The internal structure of FIG. 21 is different from the structure of FIG. 3 in that the feature amount extraction unit 1 is replaced by a shake feature extraction unit 54, and the angle estimation unit and the slant estimation unit 7 are replaced by a shake amount estimation unit 55 and an image stabilization unit 56, respectively. Out of the constituent elements shown in FIG. 21, those that are also shown in FIG. 3 are labeled the same reference numbers as their counterparts in FIG. 3, and the descriptions thereof are omitted.

(Shake Feature Extraction Unit 54)

The shake feature extraction unit 54 extracts feature amounts from each of the picture data pieces stored in the frame memories 30 and 40. Specifically, the shake feature extraction unit 54 extracts edge components from each of the picture data pieces, the edge components being an example of the feature amounts.

(Shake Amount Estimation Unit 55)

The shake amount estimation unit 55 retrieves one or more feature points from masked frame feature data pieces, and estimates an inter-frame shake amount (i.e., an inter-frame movement of the camera).

(Image Stabilization Unit 56)

The image stabilization unit 56 performs image stabilization in accordance with the shake amount estimated by the shake amount estimation unit 55.

FIG. 22 is a flowchart of image stabilization processing. In Step S91 of the flowchart, the Harris algorithm is applied to the frame pictures t-1 and t, so as to select a predetermined number of points that are reliably extract able as candidate points (points to be candidates for the feature points included in the background edge images). In Step S92, each of the selected candidate points is projected onto coordinate systems on unit spheres (radius=1), so as to remove, for example, influences of the difference in angles of view.

FIG. 23 shows feature amounts that are obtained from the frame pictures t-1 and t and that are projected onto the coordinate systems of the unit spheres (radius=1). As shown in FIG. 23, the feature amounts obtained from the frame pictures t-1 and t are categorized into two groups: those belonging to the foreground edge images and those belonging to the background edge images. Out of all the feature amounts, only those belonging to the background edge images are projected onto the unit sphere. In other words, the feature amounts belonging to the foreground edge images are not projected onto the unit sphere. This is because the foreground edge images have been masked in the masked frame feature data pieces.

Thereafter, a rotation matrix R will be calculated using a RANSAC method.

Described blow are procedures for calculating a rotation matrix R using the RANSAC method. In Step S93, two candidate points are randomly selected from each of the frame pictures t-1 and t, the two candidate points being included in the candidate points which belong to edge images other than the foreground edge images and therefore have been projected onto the unit spheres. Steps S94 through S99 form a loop.

The following are performed in the loop. First, a pseudo rotation matrix R, which indicates a relationship between the two points randomly selected from the frame picture t-1 and the two points randomly selected from the frame picture t (four points in total), is calculated (Step S94). In accordance with the pseudo rotation matrix R calculated, points that are (i) included in the frame picture t-1 and (ii) other than the two points randomly selected are rotated (Step S95). After calculating a pseudo rotation matrix R for this rotation, a match level between the frame picture t-1, which has been rotated in the above manner, and the frame picture t is measured (Step S97). Then, in Step S97, it is judged whether or not a time period between Step S94 and Step S98 is within a specified time period. If judged in the affirmative (Yes of Step S98), then two candidate points are randomly selected from each of the frame pictures t-1 and t, the two candidate points (i) being other than the candidate points that have been randomly selected already and (ii) being projected onto the unit spheres for belonging to edge images other than the foreground edge images (Step S99). Upon completion of Step S99, the processing of Step S94 is performed again. As stated above, in the loop of Steps S94 through S99, two candidate points that (i) have not been selected yet and (ii) belong to edge images other than the foreground edge images are randomly selected, and a pseudo rotation matrix is calculated for each pair of two randomly selected points. Throughout the loop, this processing is repeated until it is performed on every possible pair of candidate points.

If the specified time period expires, then the "No" path will be taken after Step S98. In Step S100, from among all the pseudo rotation matrixes R that have been calculated in one-to-one correspondence with all the pairs of two candidate points, a pseudo rotation matrix R associated with the highest match level is selected and considered as a rotation matrix R indicating the inter-frame shake amount. In Step S101, stabilization processing is performed on the frame picture t-1 in accordance with the selected rotation matrix R.

As has been described, according to the present embodiment, a foreground edge image is separated in accordance with magnitudes of inter-frame motion vectors, and shake amount detection is performed only in accordance with image features calculated from a background edge image. Therefore, the present embodiment makes it possible to estimate an inter-frame shake amount and perform image stabilization in accordance with the estimated shake amount with high accuracy, even when a person shown in each picture takes a lot of space therein.

(Fifth Embodiment)

In the above-described embodiments, a correction parameter is detected in accordance with scalar quantities of motion vectors. As opposed to this, in the present embodiment, a correction parameter is detected in an improved manner with the help of directions of motion vectors. In other words, an edge image to be masked is specified by (i) calculating a motion vector from each macro block constituting frame picture data to be processed, and (i) separating at least one of the macro blocks whose motion vector does not indicate a direction that is estimated to be accurate. Here, "the direction that is estimated to be accurate" means a direction (i) of the inter-frame movement of the camera and (ii) that is indicated by the result of shake estimation, which is mentioned in the previous embodiment.

Figure 24A:
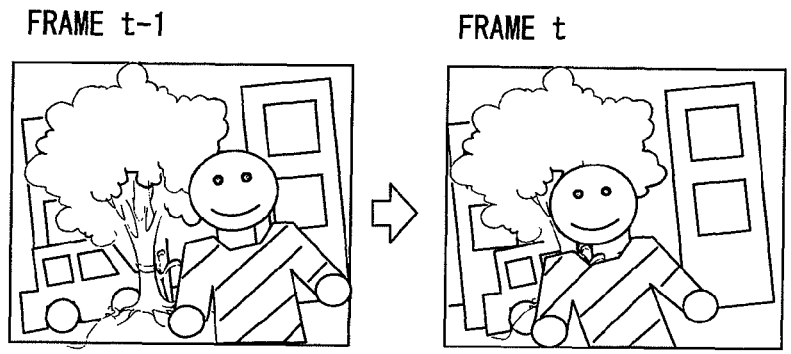
FIG. 24A shows picture data pieces obtained from consecutive frame pictures t-1 and t.
Figure 24B:
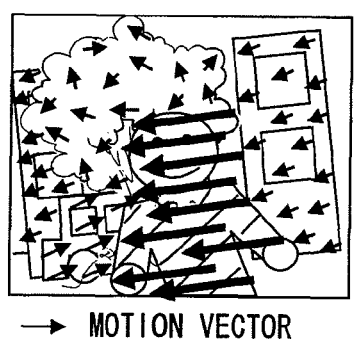
FIG. 24B shows motion vectors that have been respectively calculated from macro blocks constituting the picture data of the frame picture t.
Figure 24C:
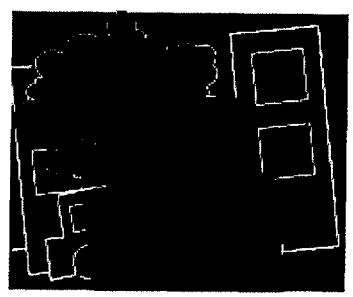
FIG. 24C shows a case where an edge image that shows no architectural structures is present in an edge image showing architectural structures as noise.

The following describes advantages of the present embodiment in comparison to the aforementioned embodiments (Embodiments 3 and 4). In Embodiment 3, each frame feature data is divided into two edge images (i.e., an edge image showing large inter-frame movements and an edge image showing small inter-frame movements) in accordance with magnitudes of the motion vectors, and the slant angle is estimated in accordance with features of one of these edge images that shows architectural structures. However, when there exist many moving objects in a frame picture, motion vectors obtained from the frame picture accordingly show various magnitudes; hence, there are times when the frame feature data cannot be properly divided into different edge images simply with use of magnitudes of the motion vectors. FIG. 24A shows picture data pieces of consecutive frame pictures t-1 and t. FIG. 24B shows motion vectors that have been respectively detected from macro blocks constituting the picture data of the frame picture t. FIG. 24C shows masked frame feature data obtained by masking only a foreground edge image out of the frame feature data, the foreground edge image showing motion vectors with large scalar quantities.

In the frame feature data of FIG. 24B, not only the architectural structures but also the tree behind the person are shown as features. Hence, in the masked frame feature data of FIG. 24C, feature amounts of the tree are shown as noise, rendering the accuracy of the slant angle estimation low.

Embodiment 3 would allow reducing such noise from the edge image showing the architectural structures, if the direction of the inter-frame movement, which indicates how the camera moved from one frame to another, could be obtained beforehand, on top of the magnitudes of inter-frame motion vectors. This is because if an edge image shows a movement direction that does not correspond to movements of the camera and architectural structures, such an edge image is not regarded as showing architectural structures, as is obvious from the fact that (i) architectural structures do not move by themselves and (ii) positions of the architectural structures in pictures move in the direction opposite to the direction in which the camera moved.

In Embodiment 4, the correction is performed by estimating an inter-frame shake amount. As is mentioned earlier, this inter-frame shake amount is equivalent to the camera's inter-frame movement amount. Therefore, if noise is present in an edge image that does not show architectural structures, such noise can be removed, by masking, out of the pixel blocks shown in FIG. 24B, one or more pixel blocks whose motion vectors do not correspond to the inter-frame movement of the camera in accordance with the stated inter-frame shake amount.

FIG. 25A shows frame feature data of FIG. 24B with some of its edge images categorized as either (i) edge images showing motion vectors whose directions are the same as a direction indicated by the result of shake amount estimation, or (ii) edge images showing motion vectors whose directions are different from the direction indicated by the result of shake amount estimation.

Referring to FIG. 25B, enclosed edge images W1 and W2 only correspond to macro blocks whose motion vectors each reflect the direction indicated by the result of shake estimation. Provided that such a direction is estimated to be accurate, a correction parameter can be detected by masking macro blocks whose motion vectors do not reflect the accurate direction. This makes it possible to remove lines delineating the tree behind the person, and accordingly to obtain a correction parameter with higher accuracy. FIG. 25C shows masked frame feature data to be used for detecting a slang angle, which is a correction parameter.

This completes the description of advantages obtained by the present embodiment in comparison to Embodiments 3 and 4.

Figure 26:
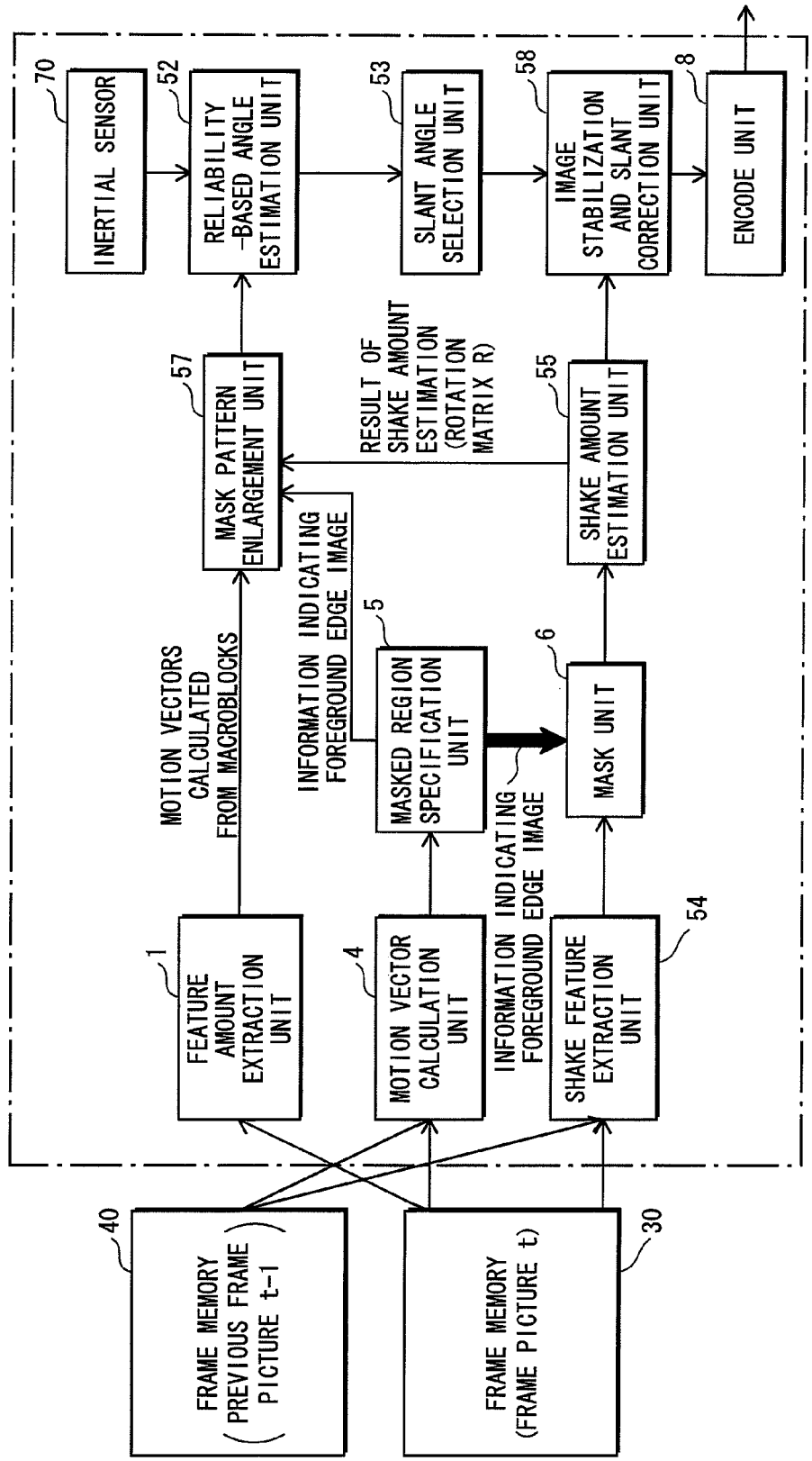
FIG. 26 shows an internal structure of an image processing device pertaining to Embodiment 5.

FIG. 26 shows an internal structure of an image processing device pertaining to Embodiment 5. The structure of FIG. 26 is a combination of a part of the internal structure shown in FIG. 16 and a part of the internal structure shown in FIG. 21. Here, the feature amount extraction unit 1, the motion vector detection unit 4, the masked region specification unit 5, the reliability-based angle estimation unit 52, the slant angle selection unit 53, and the inertial sensor 70 are derived from the internal structure shown in FIG. 16. In FIG. 26, the mask unit 6 is replaced by a mask pattern enlargement unit 57, which is a constituent element unique to the present embodiment.

The shake feature extraction unit 54, the mask unit 6, and the shake amount estimation unit 55 are derived from the internal structure shown in FIG. 21. In FIG. 26, the image stabilization unit 56 is replaced by an image stabilization and slant correction unit 58, which is also a constituent element unique to the present embodiment. The following describes these constituent elements unique to the present embodiment (i.e., the mask pattern enlargement unit 5 and the image stabilization and slant correction unit 58) and other constituent elements that have been modified to perform processing pertaining to the present embodiment (i.e., the reliability-based angle estimation unit 52 and the slant angle selection unit 53).

(Mask Pattern Enlargement Unit 57)

The mask pattern enlargement unit 57 enlarges the mask pattern specified by the masked region specification unit 5 in accordance with a result of image stabilization performed by the shake amount estimation unit 55. The masked region specification unit 5 separates a foreground edge image in accordance with magnitudes of the motion vectors. After comparing (i) directions of the motion vectors shown in the foreground edge image separated by the masked region specification unit 5 with (ii) the direction of the motion vector of the camera obtained by the shake amount estimation unit 55, the mask pattern enlargement unit 57 enlarges a region to be masked, such that the masked region would include an edge image that does not correspond to the shake amount. This forms a mask pattern in which only the edge image that corresponds to the direction of the motion vector of the camera is left unmasked.

(Reliability-Based Angle Estimation Unit 52)

The reliability-based angle estimation unit 52 has been improved in such a manner that it can estimate slant angles shown in a foreground edge image and a background edge image in accordance with reliability levels, the foreground edge image and the background edge image being separated from each other based on the mask pattern generated by the mask pattern enlargement unit 57.

(Slant Angle Selection Unit 53)

The slant angle selection unit 53 has been improved in such a manner that (i) it can compare the reliability level of the slant angle obtained from the background edge image with the reliability level of the slant angle obtained from the foreground edge image, each reliability level being calculated by the reliability-based angle estimation unit 52, and (ii) it can select the slant angle having a higher reliability level as the correct slant angle. In a case where slant angles are calculated from three edge images or more, the slant angle selection unit 53 selects one of the calculated slant angles that has the highest reliability level as the correct slant angle.

(Image Stabilization and Slant Correction Unit 58)

The image stabilization and slant correction unit 58 performs image stabilization and slant correction at a time on the frame picture t stored in the memory 30, by using the slant angle obtained by the slant angle selection unit 53 and the shake amount obtained by the shake amount estimation unit. One method to perform such image stabilization and slant correction is to use the Affine transformation, which is used in Embodiment 1 for performing slant correction.

Figure 27:
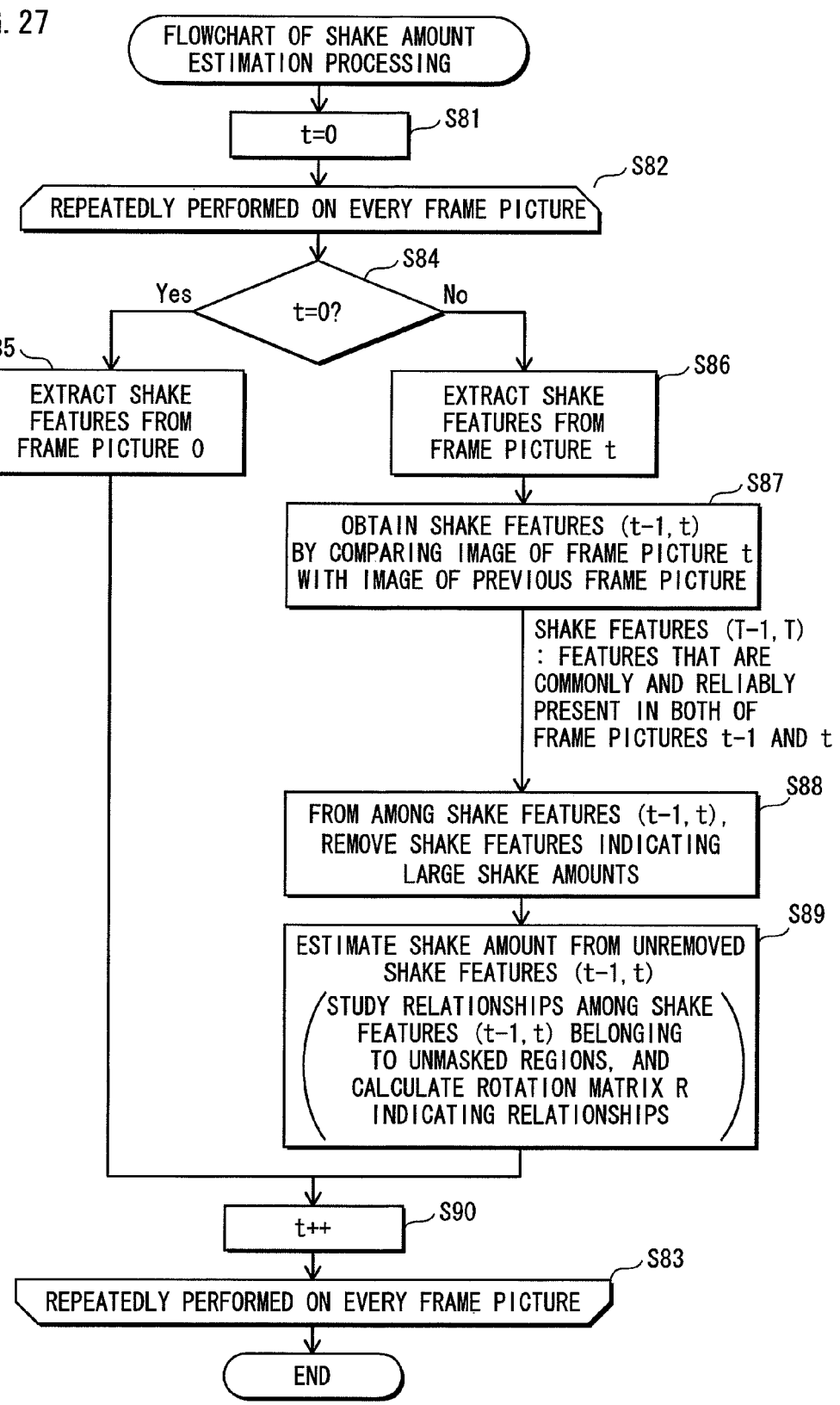
FIG. 27 is a flowchart of processing for estimating a shake amount.

FIG. 27 is a flowchart of shake amount estimation processing. In Step S81, a variable t is initialized to 0. Step S81 is followed by a loop formed from Steps S82 to S83. Throughout this loop, the processing of Steps S84 to S90 is repeatedly performed on each of the frame feature data pieces indicated by the variable t. The variable t is incremented in Step S90. First, the judgment about whether or not the variable t is 0 is performed in Step S84. If the variable t is judged to be 0, then shake features are extracted from frame feature data 0 in Step S85. If the variable t is not judged to be 0, then shake features are extracted from frame feature data t in Step S86. Thereafter, shake features (t-1,t) are obtained by comparing images of the current frame and the previous frame in Step S87. Features related to large movement amounts are removed from the obtained shake features (t-1,t).

In Step S89, out of the shake features (t-1,t), relationships among the unremoved feature points are studied. Then, a rotation matrix R indicating the relationships is calculated. The rotation matrix R serves as the result of shake estimation.

Figure 28:
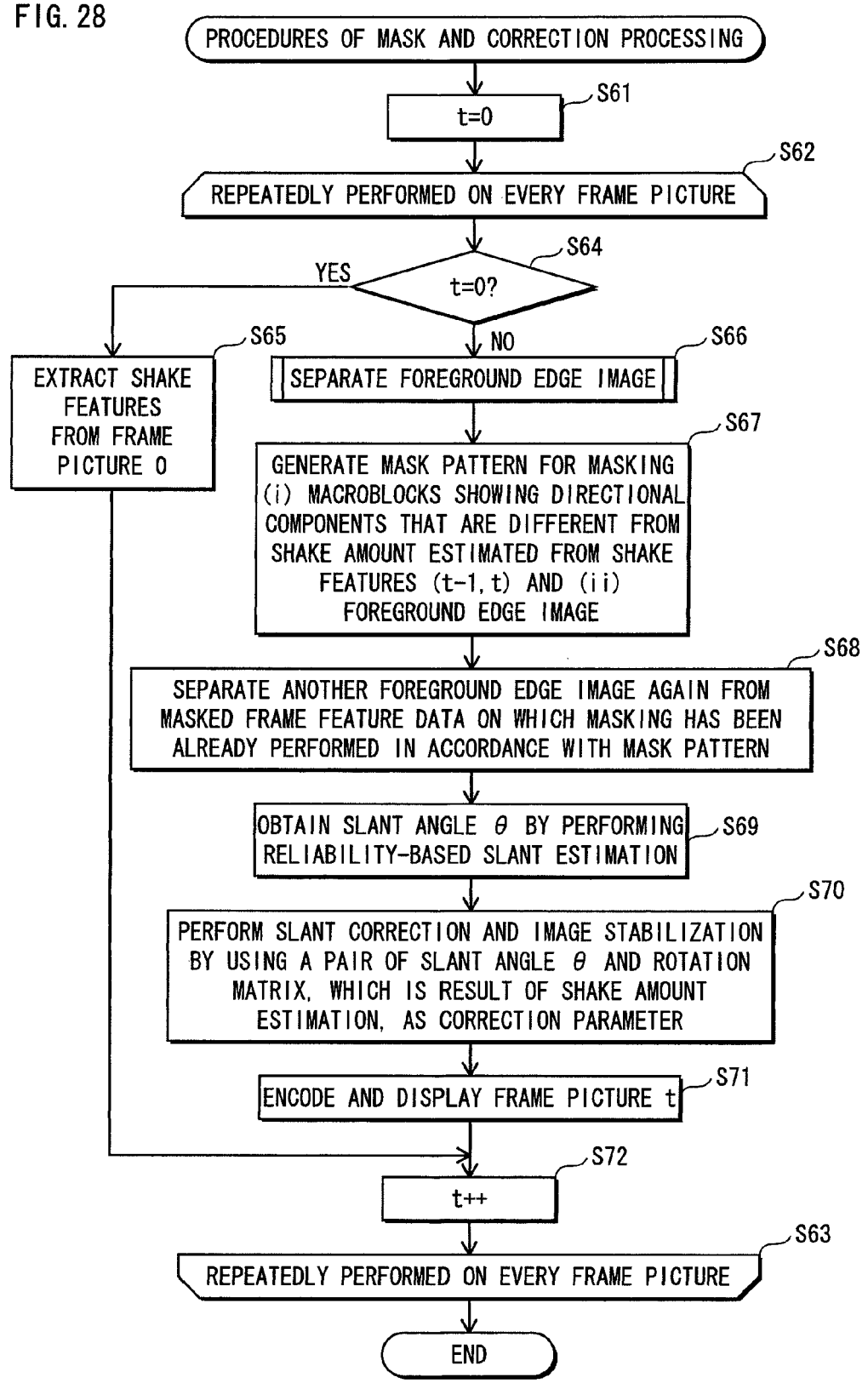
FIG. 28 is a flowchart of entire processing performed by the image processing device pertaining to Embodiment 5.

FIG. 28 is a flowchart showing processing procedures for performing mask processing and correction processing pertaining to Embodiment 5. In this flowchart, a variable t is a control variable indicating corresponding frame feature data. In Step S61, the variable t is initialized to 0. Step S61 is followed by a loop formed by Steps S62 and S63. In this loop, the processing of Steps S64 to S71 is performed on each frame feature data. In Step S64, the judgment about whether the variable t is 0 or not is made. If the variable t is judged to be 0, then shake features (t-1,t) are extracted from frame feature data 0 in Step S65.

If the variable t is not judged to be 0, then the foreground edge image is separated in Step S66. Thereafter, in Step S67, a mask pattern is generated for masking (i) blocks having directional components that are different from the result of the shake amount estimation with respect to the shake features (t-1,t) and (ii) blocks corresponding to the foreground edge image.

In Step S68, another foreground edge image is separated again by using (i) the blocks having the directional components that are different from the result of the shake amount estimation with respect to the shake features (t-1,t) and (ii) the mask pattern masking blocks corresponding to the foreground edge image.

In Step S69, a slang angle θ is calculated by (i) calculating a reliability level for each of the foreground edge image identified by the slant sensor and the background edge image that is other than the foreground edge image, and then (ii) in accordance with the calculated reliability levels, determining from which of the foreground edge image and the background edge image the slant angle should be selected.

In Step S70, slant correction and image stabilization are performed by using a pair of the slant angle θ and the rotation matrix, which is the result of shake amount estimation, as a correction parameter. In Step S71, the frame feature data t is encoded and displayed. Afterward, the variable t is incremented in Step S72.

As set forth, according to the present embodiment, noise can be removed from an edge image showing architectural structures, by (i) masking the foreground edge image in accordance with the magnitudes of the inter-frame motion vectors, and (ii) performing additional masking with use of a result of estimating an inter-frame shake amount. This makes it possible to, with high accuracy, estimate an inter-frame slant angle and perform slant correction in accordance with the estimated slant angle, even when (i) a person shown in each picture takes a lot of space therein, (ii) each picture shows a tree or the like that shows many luminance values and exhibits various inter-frame movements, and (iii) each picture coincidentally shows an object whose inter-frame movement amount is minuscule.

(Embodiment 6)

Figure 29:
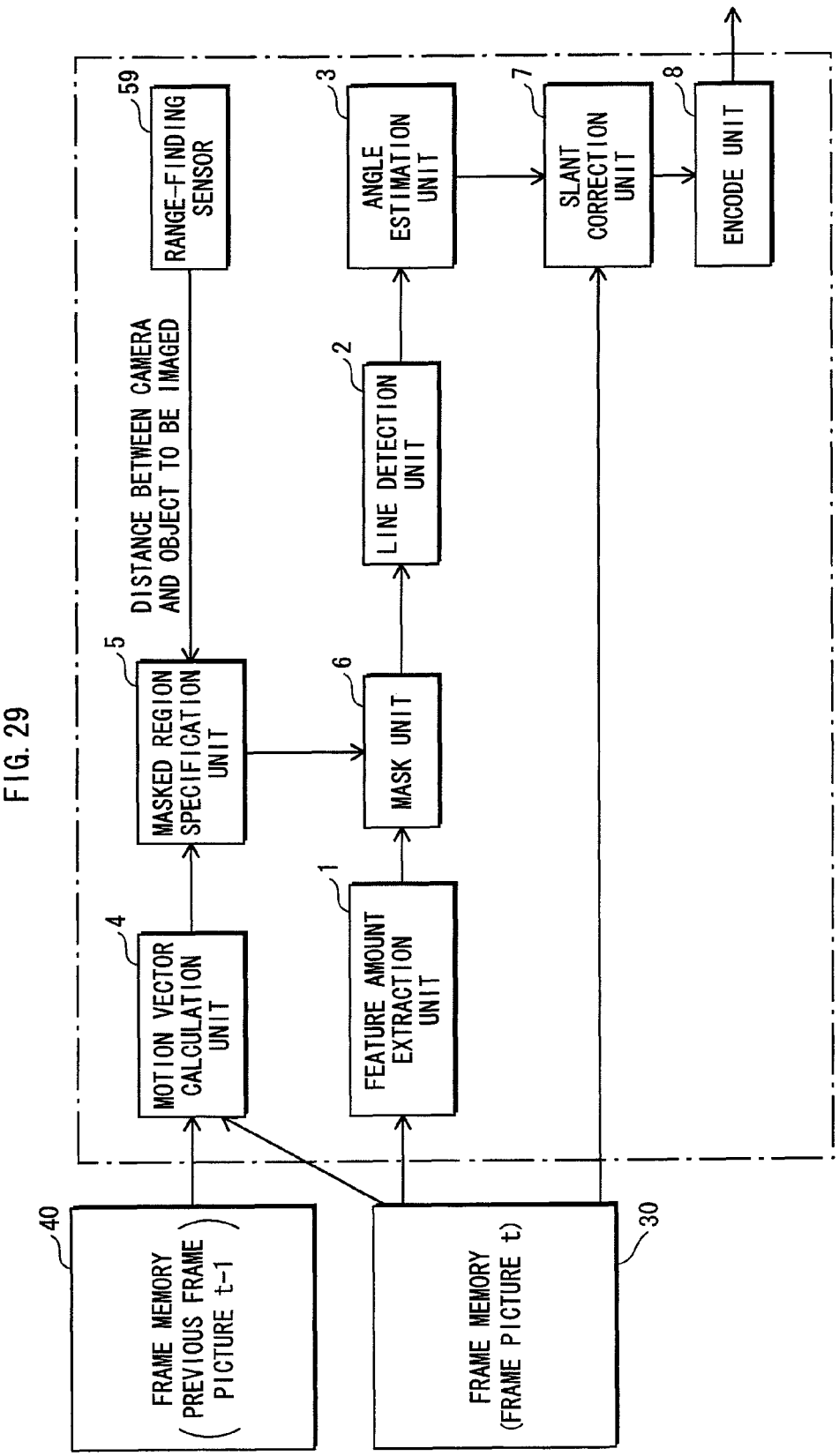
FIG. 29 shows an internal structure of an image processing device pertaining to Embodiment 6.

The present embodiment relates to improving the accuracy of the judgment about whether or not the object shown in frame picture data corresponds to a foreground edge image by using a range-finding sensor 59. FIG. 29 shows an internal structure of an image processing device pertaining to Embodiment 6. FIG. 29 is derived from FIG. 3. The internal structure of FIG. 29 is different from the internal structure of FIG. 3 in that the range-finding sensor 59 is connected to the masked region specification unit 5 in series. This is the improvement uniquely made in the present embodiment. Out of the constituent elements shown in FIG. 29, those that are also shown in FIG. 3 are labeled the same reference numbers as their counterparts in FIG. 3, and the descriptions thereof are omitted.

One example of the range-finding sensor 59 shown in FIG. 29 is an infrared sensor. The range-finding sensor 59 can measure the distance between the camera and an object when the distance is relatively close, i.e., from 3 to 5 meters approximately. By providing such a range-finding sensor in the camera, it is possible to obtain, from the camera, information on an edge image showing an object that was close from the camera in terms of distance when the camera took the picture. A foreground edge image can be reliably identified with the range-finding sensor, even when frame feature data cannot be perfectly divided into different edge images simply by measuring the magnitudes of inter-frame motion vectors (described in Embodiment 1) due to measuring errors and mishandlings.

By the masked region specification unit 5 comparing, with use of the above scheme, a result of separating an edge image showing large movement amounts with an edge image showing small movement amounts, it is possible to identify that an edge image that has been judged to be a background edge image is actually a foreground edge image due to measuring errors and mishandlings. This increases the accuracy of separating the foreground edge image from the background edge image, and therefore allows detecting a slang angle with higher accuracy.

(Variations)

1. Method for Calculating Frame Feature Data

The feature amount extraction unit 1 may additionally perform preprocessing in order to increase the signal-to-noise ratio in the edges after the edges are detected. The following are examples of preprocessing. Preprocessing performed before the edge detection includes a method for reducing noise by performing smoothing processing such as median filtering and low-pass filtering. Preprocessing performed after the edge detection includes: an acnode removal method of first performing labeling processing on edge information pieces as preprocessing and then removing isolated edges, for the purpose of removing noise included in the edge information pieces; and a method of performing opening processing as preprocessing while performing morphological filtering on the edge information pieces, for the same purpose as above.

2. Limiting Range of Angles

The range of angles may be limited in the following method: first, expressing a reliability level of the sensor in terms of likelihood; second, regarding a histogram multiplied by this likelihood of the sensor as showing existing probabilities of angles; and third, estimating one of the angles having the highest existing probability as the slant angle with respect to the real-world horizon.

With the above method, a range in which slant angles exist is limited based on the output value of the sensor. Accordingly, the correct slant angle can be estimated from a smaller range, and the accuracy of slant angle estimation is improved.

3. Region to be Masked

In the above embodiments, out of the entire frame feature data, a region to be masked is specified based on scalar quantities or directions of motion vectors that are each calculated from a corresponding one of pixel blocks. However, the basis for specifying a region to be masked is not limited to the scalar quantities or the directions of the motion vectors. Other parameters, such as DCT coefficients and direct-current components, may be used as long as they depend on motion vectors.

4. Variations of Correction Parameter

In the above embodiments, a slang angle and a rotation matrix are each detected as a correction parameter. However, other elements may be detected as correction parameters as long as they can be used in performing any form of image correction. For example, filter coefficients and a luminance conversion parameter may each be detected as a correction parameter.

5. Variations of Reliability-Based Angle Estimation

According to the foregoing description, the reliability-based angle estimation unit 52 estimates a slang angle for each of the background edge image and the foreground edge image generated by the varifocal mask unit 51. However, the reliability-based angle estimation unit 52 may calculate a reliability level only for the background edge image.

Industrial Applicability

The image processing device of the present invention has a slant correction function for correcting a slant shown in a picture taken, and is useful when applied to a video camera 100 or the like that is capable of performing imaging processing in a stable manner. The image processing device of the present invention can also be applied to a digital camera or the like.

The invention claimed is:

1. An image processing device for correcting frame picture data in accordance with a correction parameter, comprising:
   a generation unit that generates frame feature data indicating features of an edge image shown in the frame picture data;
   a calculation unit that calculates, from each of pixel blocks constituting the frame picture data, a motion vector indicating a movement between the frame picture data and previous frame picture data;
   a region specification unit that, in accordance with motion vectors calculated from the pixel blocks, specifies a region to be masked in the frame feature data; and
   a detection unit that detects the correction parameter from an unmasked region of the frame feature data,
   wherein the region to be masked corresponds to (i) a pixel block whose motion vector indicates a movement amount larger than a predetermined threshold, and (ii) a pixel block whose motion vector indicates a different directional component than a predetermined directional component, and
   wherein the predetermined directional component is a direction shown by a pixel block that is proportional to a counterpart pixel block thereof included in the previous frame picture data.

2. The image processing device of claim 1,
   wherein the predetermined threshold is an average value of movement amounts that are respectively indicated by the motion vectors.

3. The image processing device of claim 2,
   wherein the pixel block whose motion vector indicates the movement amount larger than the predetermined threshold corresponds to a foreground edge image of the frame feature data,
   wherein the region specification unit further separates the frame feature data into the foreground edge image and a background edge image in accordance with the movement amounts, and
   wherein the region to be masked by the region specification unit includes the foreground edge image and/or the background edge image.

4. The image processing device of claim 1,
   wherein the detection unit further (i) generates a histogram for each of a foreground edge image and a background edge image included in the frame feature data, excluding the region to be masked, and (ii) calculates reliability levels in accordance with an average or a distribution of each histogram, each histogram showing frequencies of angles, which are respectively indicated by angular components present in the frame feature data, and ranges of the angles,
   wherein each reliability level shows leptokurticity of the frequencies in a corresponding one of the ranges, and
   wherein the correction parameter detected by the detection unit is an angle that is selected from one of the ranges that has a highest reliability level of all the ranges.

5. The image processing device of claim 1,
   wherein correcting the frame picture data is correcting a defect caused by a shake, which is triggered when taking a frame picture of the frame picture data, by stabilizing a pair of feature points that is commonly present in the frame picture data and the previous frame picture data in accordance with a rotation matrix, and
   wherein the correction parameter detected by the detection unit is the rotation matrix indicating a shake amount by which the pair of feature points, which is present in a part of the frame picture data corresponding to the unmasked region, has moved between the frame picture data and the previous frame picture data.

6. The image processing device of claim 5,
   wherein the detection unit detects the correction parameter by (i) randomly selecting, from the part of the frame picture data, a plurality of pairs of candidate points as candidates for the pair of feature points, (ii) calculating a pseudo rotation matrix for each pair of candidate points, and (iii) calculating a match level for each pair of candidate points,
   wherein each match level shows how the frame picture data and the previous frame picture data would match with each other if the frame picture data were corrected in accordance with the corresponding pseudo rotation matrix, and
   wherein the pair of feature points to be used in association with the correction parameter is one of the pairs of candidate points that has a highest match level of all the pairs.

7. The image processing device of claim 1,
   wherein a frame picture of the frame picture data is taken by an imaging apparatus having a slant sensor,
   wherein correcting the frame picture data is correcting a defect caused by a slant, which is triggered when taking the frame picture, by performing a rotation transformation on the frame picture data,
   wherein the detection unit further (i) generates a histogram showing frequencies of angles, which are respectively indicated by angular components present in the unmasked region, and ranges of the angles, and (ii) selects, from the histogram, one of the ranges that falls within a range of angles that is output by the slant sensor, and
   wherein the correction parameter is an angle included in the selected range.

8. The image processing device of claim 1, further comprising
   a judgment unit that judges, in accordance with a distance between an imaging apparatus and an object to be imaged, whether or not each of the pixel blocks corresponds to a foreground edge image or a background edge image of the frame feature data,
   wherein a frame picture of the frame picture data is taken by the imaging apparatus having a sensor that measures the distance between the imaging apparatus and the object to be imaged,
   wherein correcting the frame picture data is correcting a defect caused by a slant, which is triggered when taking the frame picture, by performing a rotation transformation on the frame picture data, and
   wherein the region to be masked corresponds to a pixel block that has been judged to be corresponding to the foreground edge image.

9. The image processing device of claim 1, further comprising
   an estimation unit that (i) selects a pair of feature points from a pixel block that does not correspond to a foreground edge image of the frame feature data, and (ii) estimates a shake amount by which the selected pair of feature points has moved between the frame picture data and the previous frame picture data, wherein the foreground edge image corresponds to the pixel block whose motion vector indicates the movement amount larger than the predetermined threshold, and wherein a pixel block showing the predetermined directional component is determined by selecting, in accordance with the estimated shake amount, a pixel block that is proportional to a counterpart pixel block thereof included in the previous frame picture data.

10. The image processing device of claim 1,
wherein correcting the frame picture data is (i) correcting a defect caused by a slant by performing a rotation transformation on the frame picture data, and (ii) correcting a defect caused by a shake by stabilizing backgrounds of the frame picture data and the previous frame picture data, the slant and the shake being triggered when taking a frame picture of the frame picture data.

11. The image processing device of claim 1,
wherein the region specification unit further separates the frame feature data into a foreground edge image and a background edge image in accordance with movement amounts that are respectively indicated by the motion vectors, wherein the region to be masked includes the foreground edge image, wherein correcting the frame picture data is correcting a defect caused by a shake, which is triggered when taking a frame picture of the frame picture data, by stabilizing a pair of feature points that is commonly present in the frame picture data and the previous frame picture data in accordance with a rotation matrix, and wherein the correction parameter detected by the detection unit is the rotation matrix indicating a shake amount by which the pair of feature points present in a part of the frame picture data, which corresponds to the background edge image, has moved between the frame picture data and the previous frame picture data.

12. The image processing device of claim 1, further comprising
an encode unit that encodes the frame picture data that has been corrected in accordance with the correction parameter.

13. The image processing device of claim 1 being connected to a plurality of frame memories,
wherein the frame picture data is stored in one of the frame memories, whereas the previous frame picture data is stored in another one of the frame memories.

14. An image processing method for correcting frame picture data in accordance with a correction parameter, comprising the steps of:

generating frame feature data indicating features of an edge image shown in the frame picture data;

calculating, from each of pixel blocks constituting the frame picture data, a motion vector indicating a movement between the frame picture data and previous frame picture data;

specifying a region to be masked in the frame feature data, in accordance with motion vectors calculated from the pixel blocks; and detecting the correction parameter from an unmasked region of the frame feature data, wherein the region to be masked corresponds to (i) a pixel block whose motion vector indicates a movement amount larger than a predetermined threshold, and (ii) a pixel block whose motion vector indicates a different directional component than a predetermined directional component, and wherein the predetermined directional component is a direction shown by a pixel block that is proportional to a counterpart pixel block thereof included in the previous frame picture data.

15. A non-transitory computer readable recording medium having stored thereon a program for causing a computer to execute processing of correcting frame picture data in accordance with a correction parameter, the processing comprising the steps of:

generating frame feature data indicating features of an edge image shown in the frame picture data;

calculating, from each of pixel blocks constituting the frame picture data, a motion vector indicating a movement between the frame picture data and previous frame picture data;

specifying a region to be masked in the frame feature data, in accordance with motion vectors calculated from the pixel blocks; and detecting the correction parameter from an unmasked region of the frame feature data, wherein the region to be masked corresponds to (i) a pixel block whose motion vector indicates a movement amount larger than a predetermined threshold, and (ii) a pixel block whose motion vector indicates a different directional component than a predetermined directional component, and wherein the predetermined directional component is a direction shown by a pixel block that is proportional to a counterpart pixel block thereof included in the previous frame picture data.

* * * * *